US011882472B2

(12) United States Patent
Horn et al.

(10) Patent No.: US 11,882,472 B2
(45) Date of Patent: Jan. 23, 2024

(54) DIFFERENTIAL REPORTING FOR FULL-DUPLEX MULTI-BEAM COMMUNICATIONS

(71) Applicant: QUALCOMM Incorporated, San Diego, CA (US)

(72) Inventors: Idan Michael Horn, Hod Hasharon (IL); Ran Berliner, Kfar-Aviv (IL); Shay Landis, Hod Hasharon (IL); Assaf Touboul, Netanya (IL); Yehonatan Dallal, Kfar Saba (IL)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 17/406,900

(22) Filed: Aug. 19, 2021

(65) Prior Publication Data

US 2022/0078651 A1 Mar. 10, 2022

Related U.S. Application Data

(60) Provisional application No. 63/075,674, filed on Sep. 8, 2020.

(51) Int. Cl.
*H04W 24/10* (2009.01)
*H04W 72/044* (2023.01)
*H04B 17/318* (2015.01)

(52) U.S. Cl.
CPC .......... *H04W 24/10* (2013.01); *H04B 17/318* (2015.01); *H04W 72/046* (2013.01)

(58) Field of Classification Search
CPC ... H04W 24/10; H04W 72/046; H04B 17/318
See application file for complete search history.

(56) References Cited

U.S. PATENT DOCUMENTS

| 11,006,304 | B2 * | 5/2021 | Yiu | H04W 36/0083 |
| 11,032,744 | B2 * | 6/2021 | Majmundar | H04W 36/305 |
| 2017/0238294 | A1 | 8/2017 | Lim et al. | |
| 2018/0006696 | A1 * | 1/2018 | Yue | H04B 7/0617 |

(Continued)

FOREIGN PATENT DOCUMENTS

WO  WO-2022200010 A1 *  9/2022

OTHER PUBLICATIONS

International Search Report and Written Opinion—PCT/US2021/047005—ISA/EPO—dated Nov. 25, 2021 (207145WO).

*Primary Examiner* — Deepa Belur
(74) *Attorney, Agent, or Firm* — Holland & Hart LLP

(57) ABSTRACT

Methods, systems, and devices for wireless communication are described. A first device may transmit an indication of a first set of signal strength metrics for signal strengths of transmit beams of a second device using receive beams of the first device and a second set of signal strength metrics for signal strengths of transmit beams of the first device using the receive beams of the first device. The first device may determine, for one or more signal strength metrics in the first set of signal strength metrics, the second set of signal strength metrics, or both, a change in the corresponding signal strength. The first device may transmit, based at least in part on the determining, an indication of the change in the corresponding signal strength for each of the one or more signal strength metrics.

30 Claims, 18 Drawing Sheets

(56) References Cited

U.S. PATENT DOCUMENTS

| | | | |
|---|---|---|---|
| 2018/0083679 A1* | 3/2018 | Lim | H04B 17/336 |
| 2019/0068258 A1 | 2/2019 | Oteri et al. | |
| 2019/0116605 A1* | 4/2019 | Luo | H04W 72/0446 |
| 2019/0260485 A1 | 8/2019 | Byun et al. | |
| 2019/0356398 A1* | 11/2019 | Kim | H04B 17/24 |
| 2020/0178341 A1* | 6/2020 | Zhang | H04W 76/19 |
| 2021/0058117 A1* | 2/2021 | Ho | H04B 7/088 |
| 2022/0069884 A1* | 3/2022 | Zhang | H04W 76/11 |
| 2022/0077913 A1* | 3/2022 | Horn | H04B 7/088 |
| 2023/0118586 A1* | 4/2023 | Huang | H04B 7/0639 370/277 |

\* cited by examiner

| Signal RSRP | | BS Tx Beam 0 | BS Tx Beam 1 | BS Tx Beam 2 | BS Tx Beam 3 | BS Tx Beam 4 | BS Tx Beam 5 | BS Tx Beam 6 | BS Tx Beam 7 |
|---|---|---|---|---|---|---|---|---|---|
| UE Rx Panel 0 | Rx Beam 0 @ Panel 0 | | | | | ▨ | ▨ | ▨ | |
| | Rx Beam 1 @ Panel 0 | ▨ | | | | | | ▨ | |
| | Rx Beam 2 @ Panel 0 | ▨ | | ▨ | | | | ▨ | ▨ |
| | Rx Beam 3 @ Panel 0 | | | ▨ | ▨ | | | | |
| UE Rx Panel 1 | Rx Beam 0 @ Panel 1 | ▨ | | | | | ▨ | | |
| | Rx Beam 1 @ Panel 1 | | | | | ▨ | | | ▨ |
| | Rx Beam 2 @ Panel 1 | | | ▨ | ▨ | | | | ▨ |
| | Rx Beam 3 @ Panel 1 | | ▨ | | ▨ | | ▨ | | |
| UE Rx Panel 2 | Rx Beam 0 @ Panel 2 | | | | | | | ▨ | |
| | Rx Beam 1 @ Panel 2 | | | | | | | | |
| | Rx Beam 2 @ Panel 2 | | ▨ | | | | | | ▨ |
| | Rx Beam 3 @ Panel 2 | | | | ▨ | | | | ▨ |

DIFFERENTIAL REPORTING FOR FULL-DUPLEX MULTI-BEAM COMMUNICATIONS

CROSS REFERENCE

The present application for patent claims the benefit of U.S. Provisional Patent Application No. 63/075,674 by Horn et al., entitled "DIFFERENTIAL REPORTING FOR FULL-DUPLEX MULTI-BEAM COMMUNICATIONS" and filed Sep. 8, 2020, which is assigned to the assignee hereof and expressly incorporated by reference herein.

FIELD OF TECHNOLOGY

The following relates to wireless communication, including differential reporting for full-duplex multi-beam communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support differential reporting for full-duplex multi-beam communications. Generally, the described techniques provide for capturing and utilization of interference and self-interference metrics for beam and/or link management/optimization. For example, a UE may identify and transmit both base station interference as well as UE self-interference information to the base station. Generally, the base station interference (e.g., a first set of signal strength metrics) may include the UE measuring performance metrics (e.g., reference signal received power (RSRP), reference signal strength indicator (RSSI), signal-to-noise ratio (SNR), channel quality information (CQI), throughput rates, etc.) for transmit beams of the base station when received using different receive beams of the UE (e.g., on a per-receive beam of the UE basis for each or a subset of available transmit beams of the base station). The UE self-interference (e.g., a second set of signal strength metrics) may include the UE measuring performance metrics (e.g., RSRP, RSSI, SNR, CQI, throughput rates, etc.) for transmit beams of the UE when received using different receive beams of the UE (e.g., on a per-receive beam of the UE basis for each or a subset of available transmit beams of the UE). The UE may transmit actual RSRP values (or RSSI, SNR, CQI, etc.), a flag indicating whether the measured transmit/receive beam pair satisfies or fails to satisfy a threshold, and the like.

The base station may use this information (as well as similar information from other UEs) for link management/optimization, beam management/optimization, etc., for the UE and/or other UEs. For example, the base station may schedule or otherwise configure the UE to receive downlink signaling via one or more pairs of base station transmit beams and UE receive beams that exhibit high signal strength (e.g., high RSRP values) in combination, and the base station may generally choose to schedule or otherwise configure the UE to concurrently transmit uplink signaling via one or more UE transmit beams that exhibit low signal strength (e.g., low RSRP values) in combination with the one or more receive beams of the UE configured for downlink reception. Accordingly, the combination of both tables (e.g., the first and second sets of signal strength metrics) will provide an indication not only of how strongly different base station transmit beams are received using different UE receive beams, but also of how strongly different UE transmit beams self-interfere with the different UE receive beams, and thus reception and use by the base station of such information when making management/optimization determinations (e.g., scheduling and other configuration determinations) may improve such management/optimization determinations. The UE(s) may then communicate with the base station using transmit/receive beam pairs selected based on the information.

As channel conditions change over time, in some aspects the UE may update the first and/or second set of signal strength metrics (e.g., the base station interference table and/or the UE self-interference metrics) with the base station. For example, the UE may identify or otherwise determine a change in one or more signal strength metric(s) in the first and/or second sets of signal strength metrics. The change may correspond to a change in the measured signal strength for base station transmit/UE receive beam pair(s) and/or for UE transmit/UE receive beam pair(s). The change may refer to any measured change, change sufficient to satisfy a change threshold, or the like. The UE may transmit or otherwise convey an indication of the change to the corresponding signal strength for the signal strength metric(s) to the base station. The indication of the change may correspond to a differential indication with respect to the first and second sets of signal strength metrics previously indicated to the base station. For example, when signaling the indication of the change to the base station, the UE may indicate the signal strength metric(s) in which the corresponding signal strength(s) have changed. The UE may signal the amount of change (e.g., in measured signal strength) and/or signal the updated signal strength. The UE may signal an indication that a signal strength metric that previously satisfied a threshold, but has changed such that it no longer satisfies the threshold (or vice versa).

The indication of the change may be indicated periodically, upon the UE detecting a change above a threshold, in response to a UE and/or base station request for updated first and/or second sets of signal strength metrics, or the like. The base station may to use the updated base station interference and UE self-interference metrics (e.g., the indicated change of the corresponding signal strength(s)) for link and/or beam management/optimizations. Accordingly, the differential indication (e.g., the indication of the change) may provide a means for the UE to establish a baseline interference picture with the base station, and then update the baseline using the indication of the change rather than the full first and second sets of signal strength metrics. This may reduce overhead, reduce latency, simplify processing, and the like, for the base station and/or UE.

A method for wireless communication at a first device (e.g., a UE or a base station) is described. The method may include transmitting an indication of a first set of signal strength metrics for signal strengths of transmit beams of a second device (e.g., a UE or a base station) using receive beams of the first device and a second set of signal strength metrics for signal strengths of transmit beams of the first device using the receive beams of the first device, determining, for one or more signal strength metrics in the first set of signal strength metrics, the second set of signal strength metrics, or both, a change in the corresponding signal strength, and transmitting, based on the determining, an indication of the change in the corresponding signal strength for each of the one or more signal strength metrics.

An apparatus for wireless communication at a first device is described. The apparatus may include a processor, memory in electronic communication with the processor, and instructions stored in the memory. The instructions may be executable by the processor to cause the apparatus to transmit an indication of a first set of signal strength metrics for signal strengths of transmit beams of a second device using receive beams of the first device and a second set of signal strength metrics for signal strengths of transmit beams of the first device using the receive beams of the first device, determine, for one or more signal strength metrics in the first set of signal strength metrics, the second set of signal strength metrics, or both, a change in the corresponding signal strength, and transmit, based on the determining, an indication of the change in the corresponding signal strength for each of the one or more signal strength metrics.

Another apparatus for wireless communication at a first device is described. The apparatus may include means for transmitting an indication of a first set of signal strength metrics for signal strengths of transmit beams of a second device using receive beams of the first device and a second set of signal strength metrics for signal strengths of transmit beams of the first device using the receive beams of the first device, means for determining, for one or more signal strength metrics in the first set of signal strength metrics, the second set of signal strength metrics, or both, a change in the corresponding signal strength, and means for transmitting, based on the determining, an indication of the change in the corresponding signal strength for each of the one or more signal strength metrics.

A non-transitory computer-readable medium storing code for wireless communication at a first device is described. The code may include instructions executable by a processor to transmit an indication of a first set of signal strength metrics for signal strengths of transmit beams of a second device using receive beams of the first device and a second set of signal strength metrics for signal strengths of transmit beams of the first device using the receive beams of the first device, determine, for one or more signal strength metrics in the first set of signal strength metrics, the second set of signal strength metrics, or both, a change in the corresponding signal strength, and transmit, based on the determining, an indication of the change in the corresponding signal strength for each of the one or more signal strength metrics.

Some examples of the method, apparatuses, and non-transitory computer-readable medium described herein may further include operations, features, means, or instructions for receiving a request for an updated first set of signal strength metrics, an updated second set of signal strength metrics, or both, where the indication of the change may be transmitted based on the request.

In some examples of the method, apparatuses, and non-transitory computer-readable medium described herein, the determining may include operations, features, means, or instructions for determining, for the one or more signal strength metrics in the first set of signal strength metrics, the second set of signal strength metrics, or both, that the corresponding signal strength indicated in the first set of signal strength metrics and the second set of signal strength metrics satisfies a threshold and determining that an updated corresponding signal strength for the one or more signal strength metrics fails to satisfy the threshold, where the indication of the change includes the one or more signal strength metrics based on the updated corresponding signal strength failing to satisfy the threshold.

In some examples of the method, apparatuses, and non-transitory computer-readable medium described herein, the determining may include operations, features, means, or instructions for determining, for the one or more signal strength metrics in the first set of signal strength metrics, the second set of signal strength metrics, or both, that the corresponding signal strength indicated in the first set of signal strength metrics and the second set of signal strength metrics fails to satisfy a threshold and determining that an updated corresponding signal strength for the one or more signal strength metrics satisfies the threshold, where the indication of the change includes the one or more signal strength metrics based on the updated corresponding signal strength satisfying the threshold.

Some examples of the method, apparatuses, and non-transitory computer-readable medium described herein may further include operations, features, means, or instructions for receiving a request for an updated first set of signal strength metrics and an updated second set of signal strength metrics, updating the first set of signal strength metrics based on measuring a reference signal transmitted by the second device using each of a set of transmit beams of the second device on a per-receive beam of the first device basis, updating the second set of signal strength metrics based on measuring a reference signal transmitted by the first device using each of a set of transmit beams of the first device on a per-receive beam of the first device basis, and transmitting an indication of the updated first set of signal strength metrics and the updated second set of signal strength metrics.

Some examples of the method, apparatuses, and non-transitory computer-readable medium described herein may further include operations, features, means, or instructions for determining that the change in the signal strength for the corresponding signal strength metrics in the first set of signal strength metrics and the second set of signal strength metrics fails to satisfy a change threshold and transmitting a request to transmit an indication of the change based on the change failing to satisfy the change threshold.

Some examples of the method, apparatuses, and non-transitory computer-readable medium described herein may further include operations, features, means, or instructions for determining that the change in the signal strength for the corresponding signal strength metrics in the first set of signal strength metrics and the second set of signal strength metrics satisfies a change threshold and transmitting a request to transmit an indication of the first set of signal strength metrics and the second set of signal strength metrics based on the change satisfying the change threshold.

Some examples of the method, apparatuses, and non-transitory computer-readable medium described herein may further include operations, features, means, or instructions for transmitting, based on the change in the corresponding signal strength, a request to change a periodicity for transmitting the indication of the change.

Some examples of the method, apparatuses, and non-transitory computer-readable medium described herein may further include operations, features, means, or instructions for measuring a signal strength of a reference signal transmitted by the second device using each of a set of transmit beams of the base station on a per-receive beam of the first device basis, comparing each measured signal strength to a corresponding signal strength in the first set of signal strength metrics, and determining that the change from the corresponding signal strength to the measured signal strength for the one or more signal strength metrics satisfies a threshold.

Some examples of the method, apparatuses, and non-transitory computer-readable medium described herein may further include operations, features, means, or instructions for measuring a signal strength of a reference signal transmitted by the first device using each of a set of transmit beams of the first device on a per-receive beam of the first device basis, comparing each measured signal strength to a corresponding signal strength in the second set of signal strength metrics, and determining that the change from the corresponding signal strength to the measured signal strength for the one or more signal strength metrics satisfies a threshold.

In some examples of the method, apparatuses, and non-transitory computer-readable medium described herein, the first device and the second device comprise a UE and a base station, a first UE and a second UE, or a first base station and a second base station.

A method for wireless communication at a second device (e.g., a UE or a base station) is described. The method may include receiving, from a first device (e.g., a UE or a base station), an indication of a first set of signal strength metrics for signal strengths of transmit beams of the second device using receive beams of the first device and a second set of signal strength metrics for signal strengths of transmit beams of the first device using the receive beams of the first device, receiving, from the first device, an indication of a change in a corresponding signal strength for each of one or more signal strength metrics in the first set of signal strength metrics, the second set of signal strength metrics, or both, the change based on the corresponding signal strength, selecting one or more transmit beams of the second device to use for communicating with the first device based on the indication, and communicating with the first device using the one or more transmit beams of the second device.

An apparatus for wireless communication at a first device is described. The apparatus may include a processor, memory in electronic communication with the processor, and instructions stored in the memory. The instructions may be executable by the processor to cause the apparatus to receive, from a first device, an indication of a first set of signal strength metrics for signal strengths of transmit beams of the second device using receive beams of the first device and a second set of signal strength metrics for signal strengths of transmit beams of the first device using the receive beams of the first device, receive, from the first device, an indication of a change in a corresponding signal strength for each of one or more signal strength metrics in the first set of signal strength metrics, the second set of signal strength metrics, or both, the change based on the corresponding signal strength, select one or more transmit beams of the second device to use for communicating with the first device based on the indication, and communicate with the first device using the one or more transmit beams of the second device.

Another apparatus for wireless communication at a second device is described. The apparatus may include means for receiving, from a first device, an indication of a first set of signal strength metrics for signal strengths of transmit beams of the second device using receive beams of the first device and a second set of signal strength metrics for signal strengths of transmit beams of the first device using the receive beams of the first device, means for receiving, from the first device, an indication of a change in a corresponding signal strength for each of one or more signal strength metrics in the first set of signal strength metrics, the second set of signal strength metrics, or both, the change based on the corresponding signal strength, means for selecting one or more transmit beams of the second device to use for communicating with the first device based on the indication, and means for communicating with the first device using the one or more transmit beams of the second device.

A non-transitory computer-readable medium storing code for wireless communication at a second device is described. The code may include instructions executable by a processor to receive, from a first device, an indication of a first set of signal strength metrics for signal strengths of transmit beams of the second device using receive beams of the first device and a second set of signal strength metrics for signal strengths of transmit beams of the first device using the receive beams of the first device, receive, from the first device, an indication of a change in a corresponding signal strength for each of one or more signal strength metrics in the first set of signal strength metrics, the second set of signal strength metrics, or both, the change based on the corresponding signal strength, select one or more transmit beams of the second device to use for communicating with the first device based on the indication, and communicate with the first device using the one or more transmit beams of the second device.

Some examples of the method, apparatuses, and non-transitory computer-readable medium described herein may further include operations, features, means, or instructions for transmitting a request for an updated first set of signal strength metrics, an updated second set of signal strength metrics, or both, where the indication of the change may be received based on the request.

Some examples of the method, apparatuses, and non-transitory computer-readable medium described herein may further include operations, features, means, or instructions for transmitting a request for an updated first set of signal strength metrics and an updated second set of signal strength metrics and receiving an indication of an updated first set of signal strength metrics and an updated second set of signal strength metrics from the first device based on the request.

Some examples of the method, apparatuses, and non-transitory computer-readable medium described herein may further include operations, features, means, or instructions for receiving, from the first device, a request for the first device to transmit the indication of the change based on the change failing to satisfy a change threshold.

Some examples of the method, apparatuses, and non-transitory computer-readable medium described herein may further include operations, features, means, or instructions for receiving, from the first device, a request for the first device to transmit an indication of the first set of signal strength metrics and the second set of signal strength metrics based on the change satisfying a change threshold.

Some examples of the method, apparatuses, and non-transitory computer-readable medium described herein may further include operations, features, means, or instructions for receiving, from a third device (e.g., a UE or base station), an indication of a third set of signal strength metrics for signal strengths of transmit beams of the second device using receive beams of the third device and a fourth set of signal strength metrics for signal strengths of transmit beams of the third device using receive beams of the third device, where selecting the one or more transmit beams of the second device to use for communicating with the first device may be based on the third set of signal strength metrics, the fourth set of signal strength metrics, or both.

In some examples of the method, apparatuses, and non-transitory computer-readable medium described herein, the first device and the second device comprise a UE and a base station, a first UE and a second UE, or a first base station and a second base station.

BRIEF DESCRIPTION OF THE DRAWINGS

FIGS. 3A and 3B illustrate an example of a table configuration that supports differential reporting for full-duplex multi-beam communications in accordance with aspects of the present disclosure.

DETAILED DESCRIPTION

Figure 1:
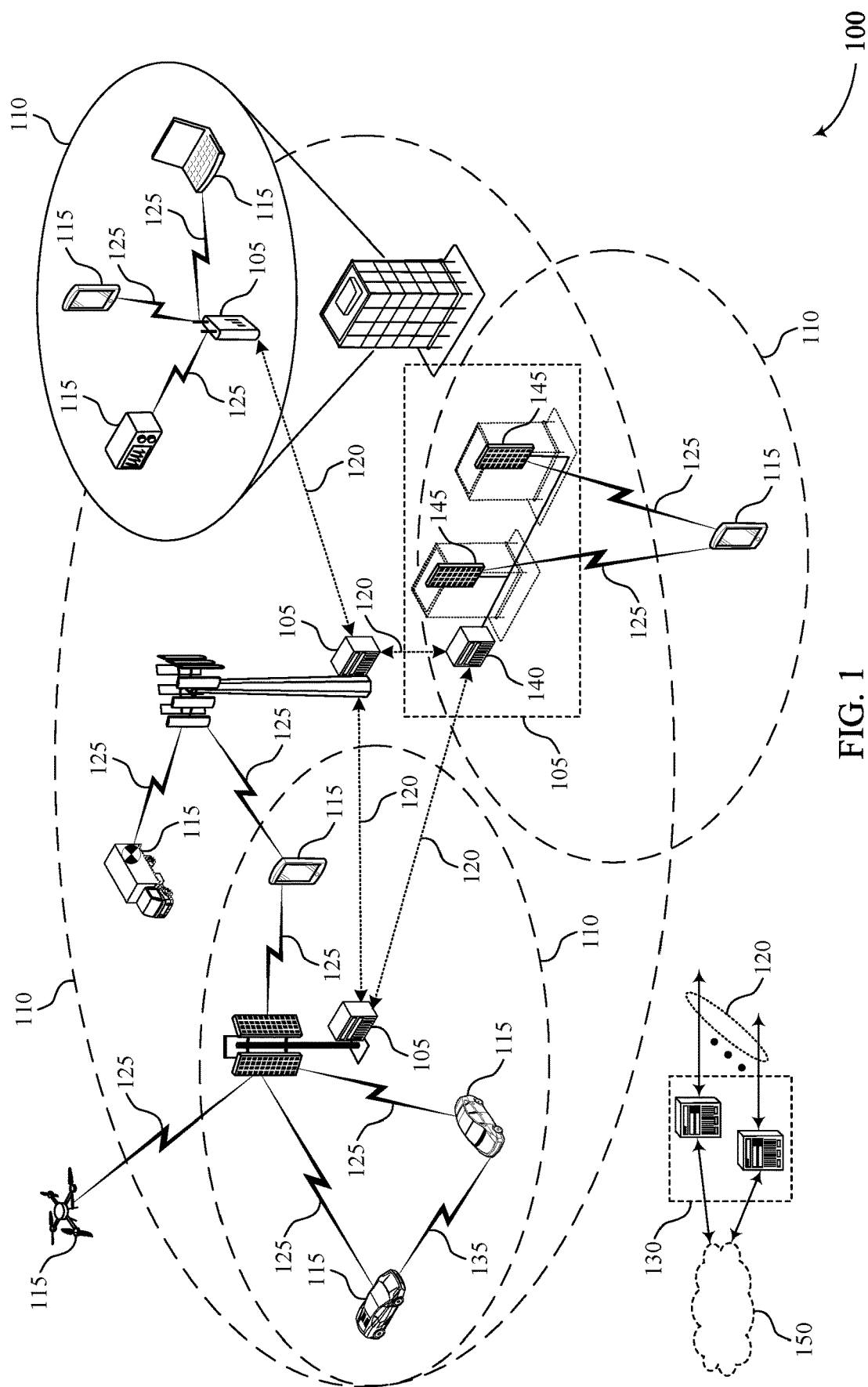
FIG. 1 illustrates an example of a system for wireless communication that supports differential reporting for full-duplex multi-beam communications in accordance with aspects of the present disclosure.

Some wireless communications systems may use full-duplex wireless communications where devices (e.g., user equipment (UE)(s) and/or base station(s)) are able to transmit and receive at the same time. Such full-duplex communications may be enhanced using beamforming techniques (e.g., directional transmissions and/or receptions) where transmit/receive beam pairs are employed for the directional transmissions. In millimeter wave (mmW) and sub-THz frequency ranges, the number of antennal panels (e.g., panels consisting of antenna(s), antenna port(s), antenna configurations, beamforming configurations, etc.) may be leveraged to increase full-duplex communications, which supports more efficient beamforming spatial separation and therefore enhances full-duplex communications. Such wireless communication systems may use interference introduced from the base station performing transmissions to select the beam pair to be used for communications with different UE(s). However, such base station interference may not provide a comprehensive picture of the full interference experienced by the UE(s), e.g., due to UE transmissions. This may limit the effectiveness of beam management/optimization techniques.

Aspects of the disclosure are initially described in the context of wireless communications systems. Generally, the described techniques provide for capturing and utilization of both interference and self-interference metrics for beam and/or link management/optimization. For example, a UE may identify and transmit both base station interference as well as UE self-interference information to the base station. Generally, the base station interference (e.g., a first set of signal strength metrics) may include the UE measuring performance metrics (e.g., reference signal received power (RSRP), reference signal strength indicator (RSSI), signal-to-noise ratio (SNR), channel quality information (CQI), throughput rates, etc.) for transmit beams of the base station for receive beams of the UE (e.g., on a per-receive beam of the UE basis for each or a subset of available transmit beams of the base station). The UE self-interference (e.g., a second set of signal strength metrics) may include the UE measuring performance metrics (e.g., RSRP, RSSI, SNR, CQI, throughput rates, etc.) for transmit beams of the UE for receive beams of the UE (e.g., on a per-receive beam of the UE basis for each or a subset of available transmit beams of the UE). The UE may transmit actual RSRP values (or RSSI, SNR, CQI, etc.), a flag indicating whether the measured transmit/receive beam pair satisfies or fails to satisfy a threshold, and the like.

The base station may use this information (as well as similar information from other UEs) for link management/optimization, beam management/optimization, etc., for the UE and/or other UEs. For example, the base station may schedule or otherwise configure the UE to receive downlink signaling via one or more pairs of base station transmit beams and UE receive beams that exhibit high signal strength (e.g., high RSRP values) in combination, and the base station may generally choose to schedule or otherwise configure the UE to concurrently transmit uplink signaling via one or more UE transmit beams that exhibit low signal strength (e.g., low RSRP values) in combination with the one or more receive beams of the UE configured for downlink reception. If a particular UE transmit beam and a particular UE receive beam exhibit high signal strength in combination, this may correspond to a high degree of self-interference between those beams, and thus uplink transmission by the UE using the particular UE transmit beam may be undesirable if the particular UE receive beam is concurrently used for downlink reception, whereas a different UE transmit beam may be used for uplink signaling with relatively little self-interference as indicated by such beam combination exhibiting low signal strength. Accordingly, the combination of both tables (e.g., the first and second sets of signal strength metrics) will provide an indication not only of how strongly different base station transmit beams are received using different UE receive beams, but also of how strongly different UE transmit beams self-interfere with the different UE receive beams, and thus reception and use by the base station of such information when making management/optimization determinations (e.g., scheduling and other configuration determinations) may improve such management/optimization determinations. A base station may take into account such information as received from multiple UEs when making scheduling or other management determination regarding the beams to be used by any one UE for downlink or uplink communications (e.g., as what base station transmit beams are used for communications with one UE may impact what base station transmit beams are used for communications with another UE, and which may have further ripple effects into what UE receive beams and UE transmit beams re used by any particular UE. The UE(s) may then communicate with the base station using transmit/receive beam pairs selected based on the information.

As channel conditions change over time, in some aspects the UE may update the first and/or second set of signal strength metrics (e.g., the base station interference table and/or the UE self-interference metrics) with the base station. For example, the UE may identify or otherwise determine a change in one or more signal strength metric(s) in the first and/or second sets of signal strength metrics. The change may correspond to a change in the measured signal strength for base station transmit/UE receive beam pair(s) and/or for UE transmit/UE receive beam pair(s). The change may refer to any measurable or measured change, to change sufficient to satisfy a change threshold, and the like. The UE may transmit or otherwise convey an indication of the change to the corresponding signal strength for the signal strength metric(s) to the base station. The indication of the change may correspond to a differential indication with respect to the first and second sets of signal strength metrics previously indicated to the base station. For example, when signaling the indication of the change to the base station, the UE may indicate the signal strength metric(s) in which the corresponding signal strength(s) have changed. The UE may signal the amount of change (e.g., in measured signal strength) and/or signal the updated signal strength. The UE may signal an indication that a signal strength metric that previously satisfied a threshold, but has changed such that it no longer satisfies the threshold (or vice versa).

The indication of the change may be indicated periodically, upon the UE detecting a change above a threshold, in response to a UE and/or base station request for updated first and/or second sets of signal strength metrics, or the like. The base station may to use the updated base station interference and UE self-interference metrics (e.g., the indicated change of the corresponding signal strength(s)) for link and/or beam management/optimizations. Accordingly, the differential indication (e.g., the indication of the change) may provide a means for the UE to establish a baseline interference picture with the base station, and then update the baseline using the indication of the change rather than the full first and second sets of signal strength metrics. This may reduce overhead, reduce latency, simplify processing, and the like, for the base station and/or UE.

Aspects of the disclosure are further illustrated by and described with reference to apparatus diagrams, system diagrams, and flowcharts that relate to differential reporting for full-duplex multi-beam communications.

FIG. 1 illustrates an example of a wireless communications system 100 that supports differential reporting for full-duplex multi-beam communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A first device (e.g., a UE 115 or base station 105) may transmit an indication of a first set of signal strength metrics for signal strengths of transmit beams of a second device (e.g., a UE 115 or base station 105) using receive beams of the first device and a second set of signal strength metrics for signal strengths of transmit beams of the first device using the receive beams of the first device. The first device may determine, for one or more signal strength metrics in the first set of signal strength metrics, the second set of signal strength metrics, or both, a change in the corresponding signal strength. The first device may transmit, based at least in part on the determining, an indication of the change in the corresponding signal strength for each of the one or more signal strength metrics.

A second device (e.g., a UE 115 and/or a base station 105) may receive, from a first device, an indication of a first set of signal strength metrics for signal strengths of transmit beams of the second device using receive beams of the first device and a second set of signal strength metrics for signal strengths of transmit beams of the first device using the receive beams of the first device. The second device may receive, from the first device, an indication of a change in a corresponding signal strength for each of one or more signal strength metrics in the first set of signal strength metrics, the second set of signal strength metrics, or both, the change based at least in part on the corresponding signal strength. The second device may select one or more transmit beams of the second device to use for communicating with the first device based at least in part on the indication. The second device may communicate with the first device using the one or more transmit beams of the second device.

Figure 2:
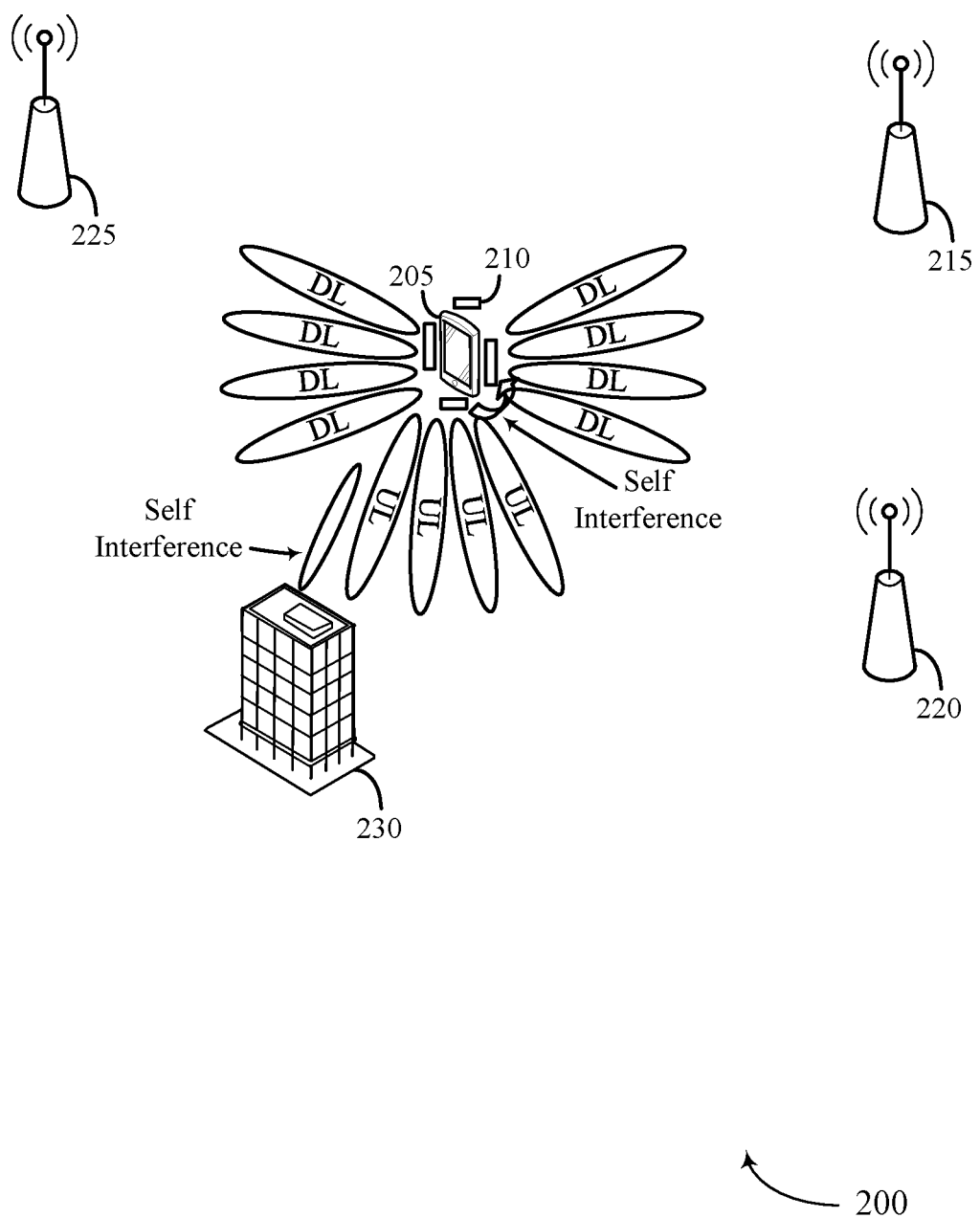
FIG. 2 illustrates an example of a wireless communication system that supports differential reporting for full-duplex multi-beam communications in accordance with aspects of the present disclosure.

FIG. 2 illustrates an example of a wireless communication system 200 that supports differential reporting for full-duplex multi-beam communications in accordance with aspects of the present disclosure. In some aspects, wireless communication system 200 may implement aspects of wireless communication system 100. Wireless communication system 200 may include UE 205 comprising a set of panels 210 (with four panels 210 being shown by way of example only), base station 215, base station 220, and base station 225, which may be examples of the corresponding devices described herein. Object 230 may be located proximate to one or more devices of wireless munitions system 200, which may include a building or any other structure that interferes, modifies, reflects, or otherwise impacts wireless communications between the devices.

In some aspects, UE 205 may support full-duplex communications such that UE 205 is able to transmit wireless communications using one or more transmit beams while simultaneously receiving wireless communications using one or more receive beams. Similarly, base station 215, base station 220, and/or a base station 225 may also support beamformed communications to UE 205 using different transmit beams, different receive beams, and the like (e.g., may also support full-duplex communications). For example, base station 215, base station 220, and/or base station 225 may perform a downlink transmission to UE 205 using a transmit beam of the respective base station, which UE 205 may receive using a corresponding receive beam of UE 205. Conversely, UE 205 may perform an uplink transmission to one or more of base station 215, base station 220, and/or base station 225, using a transmit beam of UE 205, which is received using a corresponding receive beam of the base station.

For full-duplex communications, UE 205 may perform an uplink transmission using a transmit beam of UE 205 while receiving a downlink transmission from any of base station 215, base station 220, and/or a base station 225 using a receive beam of UE 205. In some aspects, UE 205 may utilize one or more panels 210 to perform such beamformed communications. That is, each panel 210 may be located in a different location, orientation, etc., of UE 205. The panels 210 implemented at UE 205 may have the same or different capabilities with respect to the other panels 210. Each panel 210 may support beamformed communications using one or more transmit beams and/or receive beams of UE 205. That is, each panel 210 may include one or more antennas, antenna ports, may support a plurality of different antenna configurations, may support a plurality of different beamforming configurations, and the like. Accordingly, each panel 210 may be configured to provide or otherwise support one or more transmit beams and/or one or more receive beams of UE 205. Accordingly, UE 205 may be equipped or otherwise support a first set of transmit beams and/or receive beams using panel 0, a second set of transmit beams and/or receive beams using panel 1, and so forth, for each configured panel 210.

Generally, beam management for such communications includes UE 205 measuring reference signals transmitted by base station 215, base station 220, and/or base station 225 using their respective transmit beams. For example, UE 205 may measure the signal strength (e.g., RSRP, RSSI, etc.) and/or any other performance metric (e.g., CQI, SNR, throughput rate, etc.) for each transmit beam of the base station using different receive beams of UE 205. UE 205 transmits a feedback message to its serving base station (e.g., base station 215 in one non-limiting example), which uses this information to identify transmit beams of the base station and/or receive beams of UE 205 to use for beamformed communications. However, this technique may be insufficient to support beam management/optimization in some scenarios.

For example, wireless communication system 200 may support full-duplex communications between UE 205 and base station 215, base station 220, and/or base station 225. Such full-duplex communications may be implemented in the mmW range (e.g., frequency range 2 (FR2)), in the sub-THz frequency range (e.g., frequency range four (FR4), such as 140 GHz, etc.), and the like. Such full-duplex communications may double a TDD link capacity and provide very low latency. Full-duplex communications may include simultaneous transmission and reception of overlapping, non-overlapping, and/or partially overlapping FDM radio resources.

One issue to address for full-duplex communications includes strong self-interference. That is, self-interference may be associated with UE 205 transmitting while simultaneously receiving (e.g., a signal transmitted from one panel 210 may interfere with receive beams on the same panel 210 and/or on other panels 210). The self-interference may be direct (e.g., a transmission from one panel 210 interferes with receive beams on that panel 210 and/or on another panel 210) and/or indirect (e.g., a transmission from one panel 210 may reflect or bounce off of object 230, for example, with the reflected signal interfering with the same panel 210 and/or another panel 210).

One technique to mitigate such self-interference includes using beamformed communications to provide spatial separation between the transmit beam and receive beam. That is, efficient beamforming techniques may be used to suppress self-interference to a negligible, or at least manageable, level. As the number of panels 210 increases for UE 205, the degree of spatial separation may be further improved, which further supports improved full-duplex communications. For example, an enhanced array density (e.g., more dense panels 210) may enable a more narrow beam structure and a high number of elements in a small area. Moreover, efficient implementation may enable UE 205 to measure a downlink beam's RSRP, RSSI, etc., using multiple UE receive beams simultaneously. That may result in UE 205 operating multiple receive beams simultaneously and produce an RSRP vector per UE uplink beam (e.g., per UE receive beam). However, some wireless communication systems may not provide a mechanism for the UE's self-interference to be reported to its serving base station (e.g., base station 215 in this example), which may limit the base station's ability to optimize full-duplex multi-beam communications.

Accordingly, aspects of the described techniques provide various mechanisms for UE 205 to report its self-interference beam relations, which may be used by the base station to optimize the full-duplex multi-beam communications. Aspects of the described techniques create procedures for mmW, sub-THz, etc., frequency range communications to measure and report self-interference (e.g., RSRP, SINR, mutual interference, etc.) of multiple UE transmit beams to UE receive beams. Along with the joint quasi-colocation (QCL) reporting (e.g., the first set of signal strength metrics corresponding to the base station reference signals), these techniques may enable simultaneous multiple beam operations in full-duplex communications, forming a multi-transmission/reception point (TRP) connection.

For example, UE 205 may identify a first set of signal strength metrics for signal strengths of transmit beams of a base station using receive beams of UE 205. For example, UE 205 may measure a signal strength of a reference signal transmitted by the base station using each or a portion of a set of transmit beams of the base station. Such measuring may be on a per-receive beam of the UE basis (e.g., signal strengths of a base station transmit beam measured by multiple UE receive beams). That is, UE 205 may measure reference signals transmitted by some or all of the transmit beams of base station 215, base station 220, and/or base station 225. In some aspects, UE 205 may measure reference signals transmitted by the base stations using the subset of the transmit beams available on each base station (e.g., using transmit beams directed towards and/or near the location of UE 205). UE 205 may perform such measurement simultaneously using some or all of the receive beams of UE 205. For example, UE 205 may utilize one or more receive beams on one or more panels 210 to measure the reference signal transmissions at the same time. Accordingly, the result of the measuring may include the first set of signal strength metrics, which may include RSRP, RSSI, CQI, SNR, signal-to-noise-plus-interference (SINR), and the like, for each base station transmit beam/UE receive beam pair.

Accordingly, UE 205 may exploit the fact that the low complexity, low power mmW, sub-THz, etc., array (e.g., panel 210) can simultaneously operate many of its receive beams to sense a transmit beam (e.g., to measure the reference signal transmissions from base station 215, base station 220, and/or base station 225). Examples of the reference signal transmissions include, but are not limited to, CSI reference signals (CSI-RSs), beam management reference signals, tracking reference signals, synchronization signals, information block signals, and the like. Base station 215 may transmit or otherwise convey a configuration signal (e.g., RRC signal, MAC CE, a DCI, etc.) to UE 205 identifying resources for the reference signal transmissions. This may allow UE 205 to identify or otherwise determine spatially separated base stations (e.g., such as base station 215, base station 220, and/or base station 225). For each transmitted base station beam (e.g., for each transmit beam of the base station), UE 205 may measure an RSRP vector for multiple UE receive beams. By the last reference signal transmission using a transmit beam of the base station, UE 205 may hold and report an RSRP matrix which reflects all of the receive/transmit coupling options (e.g., a base station interference table indicating information associated with a signal strength for each base station transmit beam/UE receive beam pair). That is, as the base stations cycle through their transmit beams for reference signal transmissions, UE 205 may build a table including an RSRP vector for each transmit beam of the base station per each receive beam of UE 205. This table may form or otherwise define a first set of signal strength metrics for signal strengths of transmit beams of a base station (and/or multiple base stations) using receive beams of UE 205. Accordingly, UE 205 may generate a base station-to-UE interference table comprising the respective signal strength of each of the set of transmit beams of the base station for each of the set of receive beams of the UE.

UE 205 may also identify a second set of signal strength metrics for signal strengths of transmit beams of UE 205 using receive beams of UE 205. For example, UE 205 may measure a signal strength of a reference signal transmitted by UE 205 via each of a set of transmit beams of UE 205. The reference signals transmitted by UE 205 may be per-UE transmit beam for each panel 210. This measuring may be on a per-receive beam of UE 205 basis and the second set of signal strength metrics may be based on a result of the measuring. Base station 215, for example, may transmit or otherwise convey a configuration signal to UE 205 (e.g., RRC signaling, MAC CE, DCI, etc.) identifying resources for such reference signal transmissions. One example of the signaling may include a CSI report configuration message.

Accordingly, base station 215 (in this example) may configure full-duplex capable UE 205 with a set of radio resources (e.g., time, frequency, spatial, code, etc.) resources for self-interference measurements. The resources may support various UE transmit beams for panels 210. In some examples, UE 205 and base station 215 may negotiate/configure the number of UE transmit beams/panels 210 to be used to measure. UE 205 measures the self-interference at the designated occasions with simultaneous transmission and reception. That is, UE 205 may perform reference signal transmissions using one or more transmit beams of UE 205, while simultaneously measuring the reference signal transmissions using one or more receive beams of UE 205. This may permit UE 205 to find or otherwise identify spatially separated UE transmit and UE receive beams. For example, for each transmitted reference signal on a UE transmit beam, UE 205 may use a receive beam to measure an RSRP, SINR, RSSI, mutual interference, and the like, vector of multiple UE receive beams. By the last reference signal transmission using a UE transmit beam, UE 205 may hold and report an RSRP, RSSI, etc., matrix which reflects all of the UE transmit/receive beam pair/coupling options. Accordingly, UE 205 may generate a UE self-interference table comprising a respective signal strength, or information associated with the signal strength, of each of a set of transmit beams of UE 205 for each of the set of receive beams of UE 205.

UE 205 may transmit or otherwise convey an indication of the first set of signal strength metrics and the second set of signal strength metrics to base station 215 (for example), which may use this information to select one or more transmit beams to use for communicating with UE 205. In some aspects, this may include UE 205 transmitting the respective signal strengths (e.g., RSRP, RSSI, CQI, etc.) when transmitting or otherwise providing the indication of the first set of signal strict metrics and the second set of signal strength metrics. For example, UE 205 may simply transmit the measured signal strength values along with an indication of the transmit/receive beam coupling to base station 215.

In some examples, UE 205 may transmit an indication of whether the respective signal strength satisfies a threshold for each transmit/receive beam coupling. For example, UE 205 may measure reference signal transmissions from base station 215 when identifying the first set of signal strength metrics and from UE 205 when identifying the second set of signal strength metrics. UE 205 may compare the measured signal strengths to a threshold (e.g., a defined RSRP value, for example) to determine which measurements satisfy the threshold and which measurements do not satisfy the threshold. When transmitting the indication of the first set of signal strength metrics and the second set of signal strength metrics to base station 215, UE 205 may transmit a flag (e.g., a bit) set to one value indicating that the threshold is satisfied and/or to another value indicating that the threshold is not satisfied (e.g., fails to satisfy the threshold).

Base station 215 (in this example) may use the first set of signal strength metrics (e.g., the base station interference metrics) and the second set of signals strength metrics (e.g., the UE self-interference metrics) for link and/or beam management/optimizations. For example, base station 215 may identify which of its transmit beams and/or which of the UE 205 transmit beams may support concurrent beamformed communications, and select those transmit beams for continued communications.

Accordingly, 205 UE can report the full base station inter beam interference Tx-Rx coupling matrix and the UE self-interference Tx-Rx coupling matrix which reflects all the options (e.g., pairings). UE 205 may optionally report compressed format matrixes with one bit per entry in the table, where value 1 indicates interfere RSRP\SINR\etc. above defined threshold (e.g., satisfies a threshold). UE 205 may optionally report diluted matrixes according to reasonable assumptions such as an uplink beam cannot interfere itself. UE 205 may optionally report diluted matrixes according to reasonable assumptions such as an uplink beam cannot interfere beams in the same panel (assuming all beams in a panel are only for uplink or downlink).

However, channel conditions may change over time such that one or more of the measured signal strengths or other performance metric indicated in the first and/or second sets of signal strength metrics changes. For example, the channel conditions may change due to UE movement, other obstacles entering or otherwise obstructing the propagation path, and the like. Accordingly, UE 205 and/or base station 215 may update the first and/or second set of signal strength metrics by transmitting an indication of the change rather than transmitting full first and/or second sets of signal strength metrics. For example, the updating may be periodic, aperiodic, in response to a change satisfying a threshold, based on a request from base station 215 and/or UE 205, and the like. In some aspects, UE 205 updating the first and/or second sets of signal strength metrics may include UE 205 transmitting a differential report to the base station rather than the full first set of signal strength metrics and second set of signal strength metrics. That is, UE 205 may transmit an indication of the change in the corresponding signal strength for one, some, or all of the one or more signal strength metrics associated with a change in the corresponding signal strength (or any other performance metric, such as SINR, CQI, throughput rate, etc.).

That is, UE 205 may transmit the indication of the first set of signal strength metrics and the second set of signal strength metrics to base station 215 (for example) for signal strengths of transmit beams of base station 215 using receive beams of UE 205 and of transmit beams of UE 205 using receive beams of UE 205, respectively. UE 205 may then determine that the change has occurred in a corresponding signal strength for one or more of the signal strength metrics in the first set of signal strength metrics and/or the second set of signal strength metrics. Accordingly, the UE may transmit an indication of the change (e.g., the differential report) to base station 215 in order to update the first and/or second set of signal strength metrics.

As discussed, in some examples this may be based on UE 205 determining that the change in a signal strength (and/or any other performance metric) corresponding to one or more of the signal strength metrics in the first and/or second set of signal strength metrics has satisfied a threshold. For example, the threshold may correspond to a difference in RSRP, RSSI, CQI, etc., for the measured signal strength (e.g., a difference in dB from the originally indicated corresponding signal strength metric), or any other threshold established for a corresponding performance metric. In some examples, the indication of the change may correspond to the measured signal strength, a different in the signal strength reported in the first and/or second sets of signal strength metrics and the changed signal strength, and the like.

In some examples, the indication of the change may correspond to an indication that the signal strength corresponding to the signal strength metric indicated in the first and/or second sets of signal strength metrics now fails to satisfy a threshold, when the signal strength satisfied the threshold before (e.g., in the indication of the first and/or second sets of signal strength metrics). For example, when transmitting the indication of the first and/or second sets of signal strength metrics, UE 205 may indicate, for each signal strength metric, that the measured signal strength satisfies the threshold and/or fails to satisfy the threshold. UE 205 may determine that, due to the change in the corresponding signal strength, that the signal strength metric now fails to satisfy the threshold and/or satisfy the threshold, respectively. In some examples, the indication of the change more correspond to UE 205 setting a flag, bit, a field, and the like, to convey the indication of the change has occurred.

Accordingly, UE 205 may establish a baseline with base station 215 (for example) by transmitting the indication of the first set of signal strength metrics for signal strengths of transmit beams of base station 215 using receive beams of 205 and the second set of signal strength metrics for signal strengths of transmit beams of UE 205 using the receive beams of UE 205. UE 205 may subsequently determine that a change in the corresponding signal strength or any other performance metric has occurred for one or more signal strength metrics in the first set of signal strength metrics and/or the second set of signal strength metrics. Accordingly, UE 205 may transmit or otherwise convey the indication of the change in the corresponding signal strength for the one or more signal strength metrics to base station 215 to enable continued link and/or beam management/optimization based on the more comprehensive interference picture being observed by UE 205.

That is, during initial connection establishment, UE 205 may measure or otherwise determine the joint QCL (e.g., using a P2 beam refinement procedure) and self-interference, which corresponds to the first set of signal strength metrics and second set of signal strength metrics, respectively. UE 205 reports (e.g., transmits an indication) the full joint QCL and self-interference tables, e.g., using RRC messaging, a MAC CE, an aperiodic report, and the like, to base station 215 (for example). Accordingly, after UE 205 transmits an indication of the first set of signal strength metrics and the second set of signal strength metrics, this may serve as a baseline for future differential reports. Going forward, UE 205 may transmit (e.g., based on the request from base station 215, for example) to produce a differential beam management refinement report (e.g., the indication of the change, corresponding to a differential report). For the differential report, UE 205 may measure and calculate the joint QCL and self-interference tables (e.g., may once again identify the first and second sets of signal strength metrics) and report the difference with respect to the last report (e.g., report the difference or change in the corresponding signal strength(s) of the reported signal strength metrics). The differential report may indicate, for a beam pair (e.g., transmit/receive beam pair) that the measured RSRP, mutual interference, SINR, etc., either that the beam pair passed/satisfied a threshold/criteria in the last report and did not pass/fails to satisfy the threshold/criteria in the current report (e.g., the differential report) or that the beam pair failed to pass/satisfy the threshold/criteria in the last report and passes the threshold/criteria in the current report (e.g., the differential report). Base station 215 may request for UE 205 to transmit the full joint QCL and self-interference tables (e.g., a transmit a new/second indication of the first set of signal strength metrics and the second set of signal strength metrics) to establish a new baseline. For example, base station 215 may transmit a request periodically, in response to a handover, and/or due to any other triggers observed by UE 205 and/or base station 215. UE 205 can also request to report the full tables (e.g., the first set of signal strength metrics and the second set of signal strength metrics) or to recommend to reduce/enlarge the periodicity of the beam refinement procedure in order to reduce the size of the table change report (e.g., the indication of the change) for more accurate beam management.

These techniques may exploit the low cost high efficiency of sub-THz arrays to form full-duplex multi TRP connection. Mutual Interference is minimized from the UE perspective. Using mutual interference measurement (rather than relying on self-interference characterization only) may reflect the sum of internal interference and instantaneous beams reflection from the terrain. In frequency duplexing, this may provide feedback even on symbol level and can be used for fast feedback of ACK\NACK, beam tracking, etc.

Figure 3B:
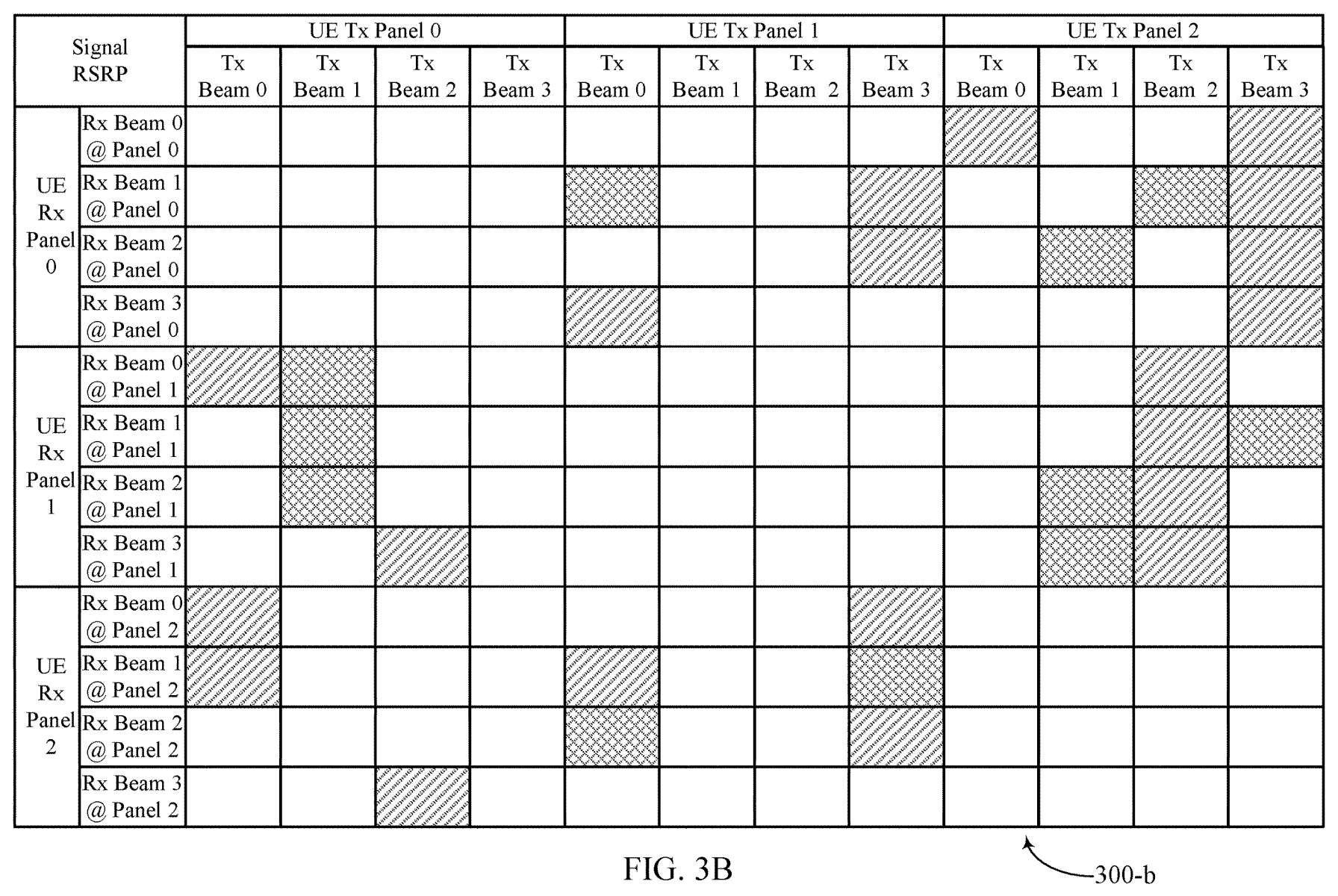

FIGS. 3A and 3B illustrate an example of a table configuration 300 that supports differential reporting for full-duplex multi-beam communications in accordance with aspects of the present disclosure. may implement aspects of wireless communication systems 100 and/or 200. Aspects of table configuration 300 may be implemented at or implemented by a UE and/or base station, which may be examples of the corresponding devices described herein. Generally, table 300-*a* of FIG. 3A illustrates an example of a base station-to-UE interference table corresponding to, or otherwise associated with, a first set of signal strength metrics. Table 300-*b* of FIG. 3B illustrates an example of a UE self-interference table corresponding to, or otherwise associated with, a second set of signal strength metrics.

As discussed above, aspects of the described techniques provide various mechanisms for a UE to report both base station interference as well as UE self-interference to its serving base station. For example, the UE may measure a signal strength of reference signals transmitted by the base station via each of a set of transmit beams of the base station. The measurement may be on a per-receive beam of the UE basis (e.g., the UE may identify a signal strength of reference signals transmitted on each base station transmit beam and received at each UE receive beam). Based at least in part on the results of the measurement, the UE may identify a first set of signal strength metrics for the signal strengths of the transmit beams of the base station using the receive beams of the UE. The UE also may measure a signal strength of reference signals transmitted by the UE via each of a set of transmit beams of the UE. The measurement may be on a per-receive beam of the UE basis (e.g., the UE may identify a signal strength of reference signals transmitted on each UE transmit beam and received at each UE receive beam). Based at least in part on the results of the measurement, the UE may identify a second set of signal strength metrics for the signal strengths of the transmit beams of the UE using the receive beams of the UE. The UE may transmit or otherwise convey an indication of the first set of signal strength metrics and the second set of signal strength metrics to the base station.

Broadly, table configuration 300-*a* of FIG. 3A illustrates an example of the first set of signal strength metrics and table configuration 300-*b* of FIG. 3B illustrates an example of the second set of signal strength metrics indicated to the base station. In some examples, the indication may include the actual signal strength for each transmit beam/receive beam pair. For example, each intersecting row/column may indicate the RSRP value, RSSI, etc., for the corresponding transmit beam (e.g., base station (BS) transmit beam and/or UE transmit beam) and receive beam (e.g., UE receive beam 0 on panel 1, UE receive beam 1 on panel 2, etc.) pair. In some aspects, each indicated signal strength may also be conveyed in a manner such that the transmit/receive beam pair is identified. In one example, the base station and UE may each know the other's capabilities such that a sequence of signal strengths may be understood to correspond to begin at row 1, column 1 (e.g., may correspond to BS transmit beam 0, UE receive beam 0 on panel 0), and subsequent signal strengths may be mapped in a left-to-right, top-to-bottom manner, or some other known mapping order.

In another example, each indicated signal strength may be accompanied by an indicator of the transmit/receive beam pair. For example, the UE may convey explicit information identifying the signal strength and transmit/receive beam pair. Accordingly, the information associated with a base station-to-UE interference table and the UE self-interference table may be the respective signal strengths.

In another example, the UE may transmit the indication of the first set of signal strength metrics and the second set of signal strength message using a bit, a field, flag, etc., that indicates that the corresponding transmit/receive beam pair satisfies or fails to satisfy a threshold. For example, the threshold may be negotiated/configured between the UE and base station, such as a threshold RSRP level, interference level, a throughput rate, etc. The UE may perform the measurements to identify the first set of signal strength metrics and the second set of signal strength metrics and compare the corresponding signal strengths to the threshold. In transmitting the indication of the first set of signal strength metrics and the second set of signal strength metrics, the UE may configure or otherwise convey an indication of transmit/receive beam pairs the satisfy the threshold (e.g., the measured signal strength satisfies the RSRP threshold) or fails to satisfy the threshold.

As also discussed above, the base station may use the combined information conveyed in the first set of signal strength metrics and the second set of signal strength metrics for link and/or beam management/optimization. That is, the base station may utilize the first set of signal strength metrics to identify the performance for each BS transmit beam/UE receive beam pair as well as the second set of signal strength metrics to identify the performance of each UE transmit beam/UE receive beam pair. Previously, the base station would only have the base station-to-UE interference information corresponding to table configuration 300-*a* when performing such link and/or beam management for/optimization. However, the described techniques enable the base station to also consider the UE self-interference as indicated in the second set of signal strength metrics.

As one example, the first and/or second sets of signal strength metrics may indicate that the UE performing uplink transmissions using UE transmit beams 2 and 3 on panel 2 (as illustrated by forward cross hatching in table configuration 300-*b*) may cause strong interference for UE receive beams 0-3 on panels 0 and 1. That is, {Panel,TxBeam}={2, 2} interferes with {Panel,RxBeam}={1,0:3} and {Panel,TxBeam}={2,3} interferes with {Panel,RxBeam}={0,0:3}. Accordingly, the base station and/or UE may avoid scheduling or otherwise configuring uplink transmissions from the UE on UE panel 2.

As another example, the first and/or second sets of signal strength metrics may indicate that the UE performing uplink transmissions using UE transmit beams on panel 0 (as illustrated by forward cross hatching in table configuration 300-*b*) may not cause interference with any base station transmit beams on other panels. That is, {Panel,TxBeam}={0,0}, {0,1}, {0,3} of the UE may not interfere with any downlink beams of the base station. Accordingly, the base station and/or UE may schedule uplink transmissions using UE transmit beams on panel 0.

As another example, the first and/or second sets of signal strength metrics may indicate that the uplink from transmissions from the UE on {Panel,TxBeam}={0,2} interfere with both base station transmit beams 0 and 7 and UE transmit beams {Panel,TxBeam}={1,2}, {2,3}. Accordingly, the base station and/or UE may avoid scheduling uplink transmissions using UE transmit beam 2 on panel 0.

As discussed above, aspects of the described techniques also provide for the UE to transmit or otherwise convey an indication of change(s) in the signal strength(s) corresponding to the signal strength metrics indicated in the first set and/or second set of signal strength metrics. For example, subsequent to transmitting the initial and/or updated first and second sets of signal strength metrics, the UE may identify or otherwise determine that a change has occurred for signal strength(s) (or any other performance metric) associated with the signal strength metrics. Accordingly, the UE may transmit an indication of the change to the base station (e.g., the differential report). The UE may transmit the indication of the change in response to a request from the base station, in response to the determination that the change has occurred, periodically, aperiodically, etc. The UE may transmit an indication of the updated first and/or second sets of signal strength metrics, e.g., in response to a request from the base station, periodically, etc.

In some aspects, the indication of the change may include the changed signal strength, the change in signal strength, and the like. The indication of the change may be based on signal strength(s) corresponding to the signal strength metrics satisfying or failing to satisfy a threshold. The indication of the change may be based on signal strength(s) corresponding to the signal strength metrics now satisfying or failing to satisfy a threshold, when such signal strength(s) failed to satisfy or satisfied the threshold before (e.g., as indicated in the first set of signal strength metrics and second set of signal strength metrics). Accordingly, the base station and/or UE may use the initial indication of the first set of signal strength metrics and second set of signal strength metrics and/or the differential report, for link/beam management/optimizations.

Although the described techniques generally refer to a base station and UE performing link and/or beam management/optimization, it is to be understood that the base station may receive similar information from other UEs (e.g., from a second UE) and use this information in addition to the first set of signal strength metrics, the second set of signal strength metrics, and/or the indication of the change, for more comprehensive link and/or beam management/optimization. For example, the base station may receive, from a second UE, an indication of a third set of signal strength metrics for signal strengths of transmit beams of the base station using receive beams of the second UE and a fourth set of signal strength metrics for signal strengths of transmit beams of the second UE using receive beams of the second UE. The base station may also receive an indication of a change from the second UE (e.g., a differential table). The second UE (and third UE, and fourth UE, and so on) may identify its own base station-to-UE interference table and UE self-interference tables and/or updates/changes to those tables, and provide this information to the base station. The base station may collect such information from multiple UEs, and use the interference information when selecting beams (e.g., base station transmit beams, UE receive beams, UE transmit beams, or any combination thereof) for communications with each UE.

Figure 4:
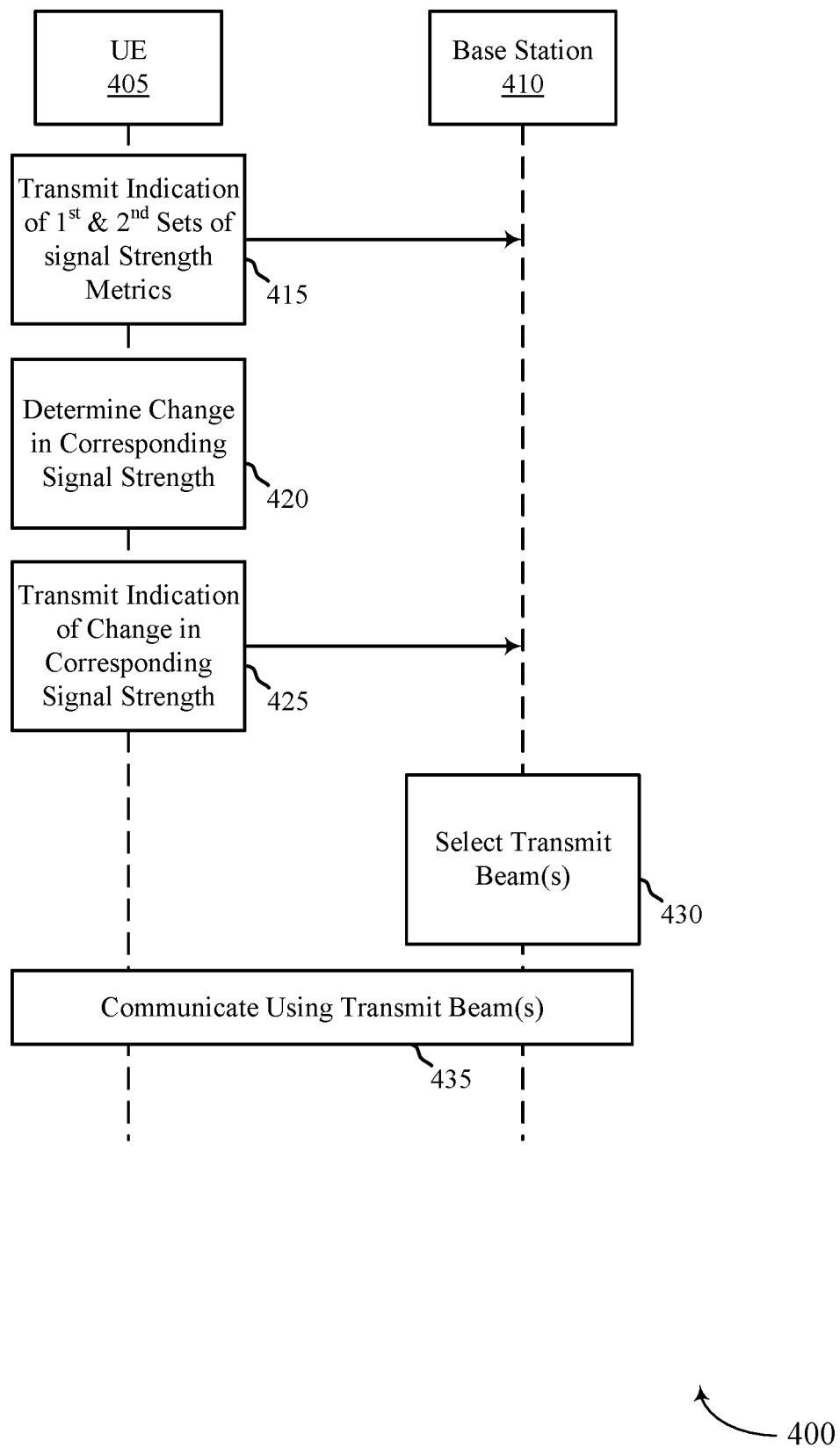
FIG. 4 illustrates an example of a process that supports differential reporting for full-duplex multi-beam communications in accordance with aspects of the present disclosure.

FIG. 4 illustrates an example of a process 400 that supports differential reporting for full-duplex multi-beam communications in accordance with aspects of the present disclosure. In some aspects, process 400 may implement aspects of wireless communication systems 100 and/or 200 and/or aspects of table configuration 300. Aspects of process 400 may be implemented by, or implemented at, UE 405 and/or base station 410, which may be examples of the corresponding devices described herein.

At 415, UE 405 may transmit (and base station 410 may receive) an indication of a first set of signal strength metrics for signal strengths of transmit beams of base station 410 using receive beams of UE 405 and a second set of signal strength metrics for signal strengths of transmit beams of UE 405 using the receive beams of UE 405. For example, UE 405 may, on a per-UE receive beam basis, measure signal strengths (e.g., RSRP, RSSI, etc.) and/or any other performance metric (e.g., SINR, CQI, a throughput rate, and the like) for each transmit beam of base station 410 to identify or otherwise determine the first set of signal strength metrics. UE 405 may measure such signal strengths and/or performance metrics using each transmit beam of UE 405 and each receive beam of UE 405 to identify or otherwise determine the second set of signal strength metrics. Accordingly, UE 405 may identify or otherwise determine full QCL and self-interference tables and report this information to base station 410.

In some aspects, the indication of the first and second sets of signal strength metrics may include the measured signal strength (e.g., RSRP), an indication of whether the measured signal strength satisfies or fails to satisfy a threshold, and the like.

In some aspects, UE 405 may update the first and/or second set of signal strength metrics indicated to base station 410 (e.g., periodically, in response to a request, in response to a measured change satisfying a threshold, etc.). For example, UE 405 may receive a request for an updated first set of signal strength metrics and an updated second set of signal strength metrics from base station 410. UE 405 may measure the reference signals transmitted by base station 410 using each transmit beam of base station 410 on a per-receive beam of UE 405 basis. UE 405 may update the first set of signal strength metrics based on the measuring. UE 405 may also measure reference signals transmitted by UE 405 using each transmit beam of UE 405 on a per-receive beam of UE 405 basis. UE 405 may update the second set of signal strength metrics based on the measuring. UE 405 may transmit or otherwise convey an indication of the updated first set of signal strength metrics and the updated second set of signal strength metrics to base station 410.

At 420, UE 405 may determine that a change in the corresponding signal strength for the one or more signal strength metrics in the first and/or second set of signal strength metrics has occurred. For example, UE 405 may measure or continue to monitor the signal strengths of each transmit/receive beam pair in the first set of signal strength metrics and the second set of signal strength metrics. UE 405 may determine that at least one signal strength has changed, that at least one signal strength has changed a sufficient amount to satisfy a threshold, that at least one signal strength has changed to a sufficient amount to no longer satisfy the threshold, and the like. Accordingly, UE 405 may identify or otherwise determine that the change has occurred.

For example, UE 405 may identify or otherwise determine, for the change to one or more signal strength metrics in the first and/or second sets of signal strength metrics, that the corresponding signal strength indicated in the first set of signal strength metrics and the second set of signal strength metrics satisfies a threshold. UE 405 may identify or otherwise determine that an updated corresponding signal strength for the one or more signal strength metrics fails to satisfy the threshold. In this situation, the indication of the change may be based on the updated corresponding signal strength failing to satisfy the threshold.

Conversely, UE 405 may identify or otherwise determine, for the change to one or more signal strict metrics in the first and/or second set of signal strength metrics, that the corresponding signal strength indicated in the first set of signal strength metrics and the second set of signal strength metrics fails to satisfy a threshold. In this situation, UE 405 may identify or otherwise determine that an updated corresponding signal strength for the one or more signal strength metrics satisfies a change threshold (e.g., a threshold associated with the amount of change in the corresponding signal strength). Accordingly, UE 405 may provide the indication of the change to the one or more signal strict metrics based on the updated corresponding signal strength satisfying the threshold.

In some aspects, the indication of the change may be triggered by UE 405. For example, UE 405 may determine that the change in the signal strength for the corresponding signal strength metrics in the first and second sets of signal strength metrics fails to satisfy a threshold. UE 405 may transmit a request to transmit the indication of the change in response. Conversely, UE 405 may determine that the change in the signal strength for the corresponding signal strength metrics in the first and/or second sets of signal strength metrics satisfies a change threshold. UE 405 may transmit a request to transmit the indication of the first and/or second set of signal strength metrics based on the change satisfying the change threshold.

At 425, UE 405 may transmit (and base station 410 may receive) an indication of the change in the corresponding signal strength for each of the one or more signal strength metrics associated with a change. In some aspects, the indication of the change may correspond to the difference in signal strength measured by UE 405, may correspond to the measured signal strength of the changed signal strength metric, may correspond to an indication that the signal strength satisfies or fails to satisfy a threshold, may correspond to an indication that the signal strength now satisfies or fails to satisfy the threshold where previously the signal strength did not satisfy or satisfied, respectively, the threshold, and the like. Accordingly, UE 405 may transmit, rather than the full first set of signal strength metrics and second set of signal strength metrics, an indication of the changes in the first and second sets of signal strength metrics to base station 410.

For example, base station 410 may transmit or otherwise convey a request to UE 405 for an updated first set of signal strength metrics and/or second set of signal strength metrics. UE 405 may identify or otherwise determine that the change has occurred, and transmit the indication of the change in response to the request.

At 430, base station 410 may select the transmit beams of base station 410 to use for communicating with UE 405 based at least in part on the indication of the change, the indication of the first set of signal strength metrics, and/or the indication of the second set of signal strength metrics. For example, base station 410 may utilize the base station interference tables (e.g., the full QCL table corresponding to the first set of signal strength metrics) and/or the self-interference table (e.g., the UE self-interference table corresponding to the second set of signal strength metrics) to identify or otherwise determine which transmit/receive beam pair(s) are performing at an acceptable level and/or an unacceptable level. Base station 410 may select the transmit beams of base station 410 based on those transmit beams having a corresponding signal strengths on UE receive beams satisfying a threshold and/or based on those transmit beams not increasing UE self-interference. Accordingly and at 435, UE 405 and base station 410 may perform wireless communications using the selected transmit beams. The wireless communications may include beamformed communications using the selected transmit beam(s).

Figure 5:
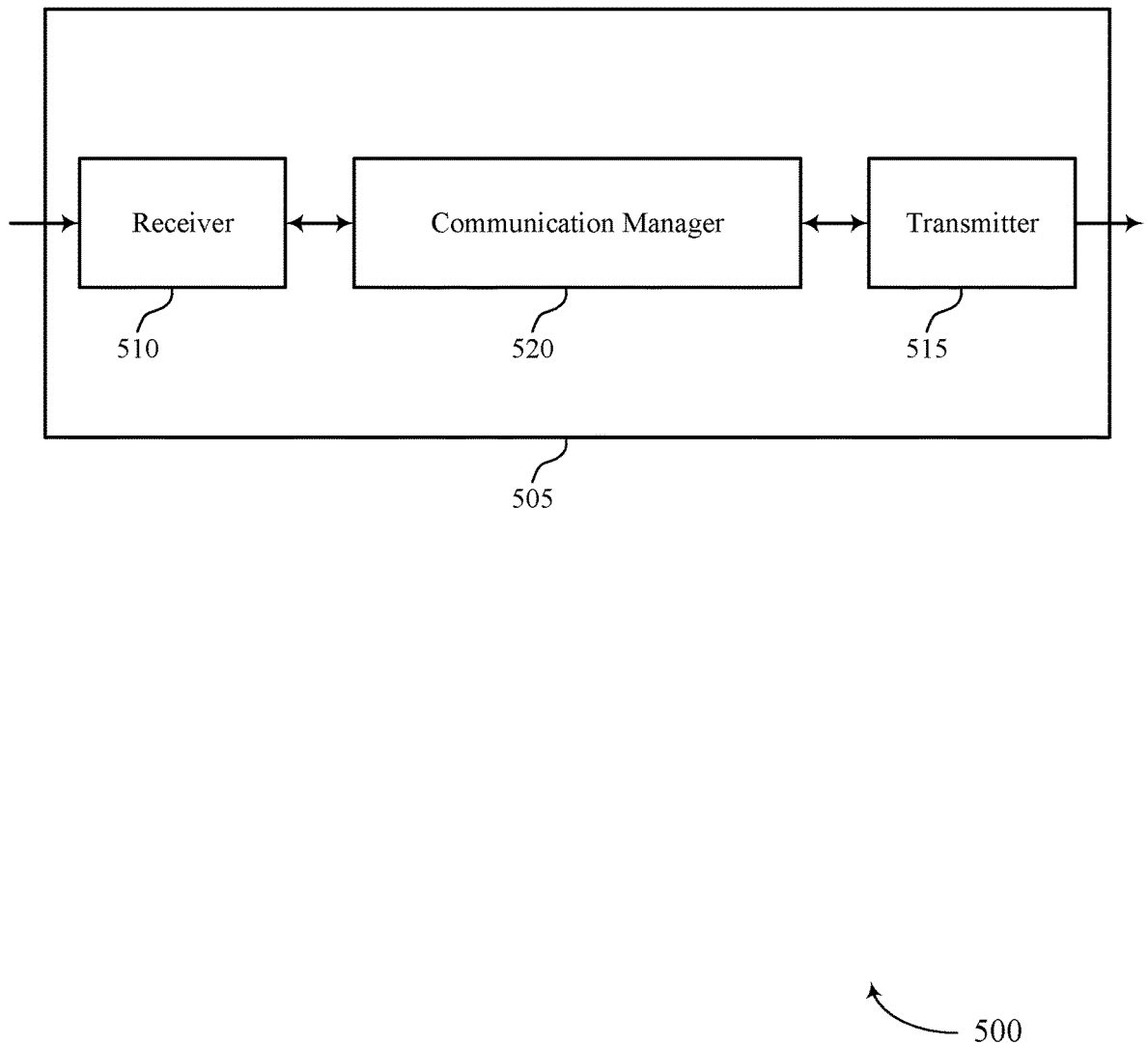
FIGS. 5 and 6 show block diagrams of devices that support differential reporting for full-duplex multi-beam communications in accordance with aspects of the present disclosure.

FIG. 5 shows a block diagram 500 of a device 505 (e.g., a first device) that supports differential reporting for full-duplex multi-beam communications in accordance with aspects of the present disclosure. The device 505 may be an example of aspects of a UE 115 or base station 105 as described herein. The device 505 may include a receiver 510, a transmitter 515, and a communication manager 520. The device 505 may also include a processor. Each of these components may be in communication with one another (e.g., via one or more buses).

The receiver 510 may provide a means for receiving information such as packets, user data, or control information associated with various information channels (e.g., control channels, data channels, information related to differential reporting for full-duplex multi-beam communications). Information may be passed on to other components of the device 505. The receiver 510 may utilize a single antenna or a plurality of antennas.

The transmitter 515 may provide a means for transmitting signals generated by other components of the device 505. In some examples, the transmitter 515 may be co-located with a receiver 510 in a transceiver module. The transmitter 515 may utilize a single antenna or a plurality of antennas.

The communication manager 520, the receiver 510, the transmitter 515, or various combinations thereof or various components thereof, may be an example of a means for performing various aspects of differential reporting for full-duplex multi-beam communications as described herein.

In some examples, the communication manager 520, the receiver 510, the transmitter 515, or various combinations thereof or components thereof, may be implemented in hardware (e.g., in communications management circuitry). The circuitry may include a processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described in the present disclosure.

Additionally or alternatively, in some examples, the communication manager 520, the receiver 510, the transmitter 515, or various combinations thereof or components thereof, may be implemented in code (e.g., as communications management software or firmware) executed by a processor. If implemented in code executed by a processor, the functions of the communication manager 520, the receiver 510, the transmitter 515, or various combinations thereof or components thereof, may be executed by a general-purpose processor, a DSP, a central processing unit (CPU), an ASIC, an FPGA, or some other programmable logic device.

In some examples, the communication manager 520 may be configured to perform various operations (e.g., receiving, monitoring, transmitting) using or otherwise in cooperation with the receiver 510, the transmitter 515, or both.

The communication manager 520 may support wireless communication at a first device in accordance with examples as disclosed herein. For example, the communication manager 520 may be configured to provide or support a means for transmitting an indication of a first set of signal strength metrics for signal strengths of transmit beams of a second device using receive beams of the first device and a second set of signal strength metrics for signal strengths of transmit beams of the first device using the receive beams of the first device. The communication manager 520 may be configured to provide or support a means for determining, for one or more signal strength metrics in the first set of signal strength metrics, the second set of signal strength metrics, or both, a change in the corresponding signal strength. The communication manager 520 may be configured to provide or support a means for transmitting, based at least in part on the determining, an indication of the change in the corresponding signal strength for each of the one or more signal strength metrics.

By including or configuring the communication manager 520 in accordance with examples as described herein, the device 505 may support improved techniques for reduced overhead, improved latency, more efficient utilization of communication resources, and the like.

Figure 6:
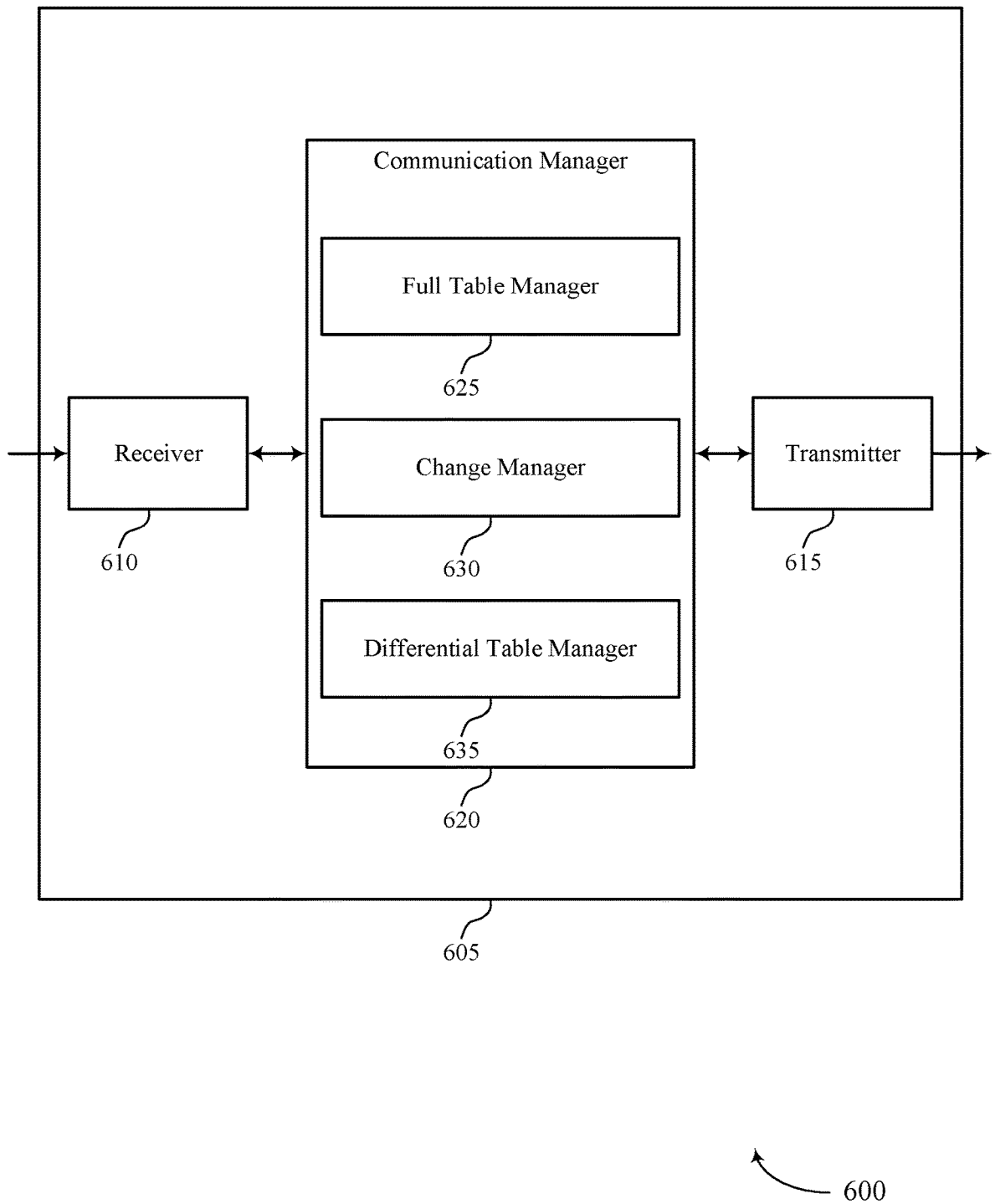

FIG. 6 shows a block diagram 600 of a device 605 (e.g., a first device) that supports differential reporting for full-duplex multi-beam communications in accordance with aspects of the present disclosure. The device 605 may be an example of aspects of a device 505, a base station 105, or a UE 115 as described herein. The device 605 may include a receiver 610, a transmitter 615, and a communication manager 620. The device 605 may also include a processor. Each of these components may be in communication with one another (e.g., via one or more buses).

The receiver 610 may provide a means for receiving information such as packets, user data, or control information associated with various information channels (e.g., control channels, data channels, information related to differential reporting for full-duplex multi-beam communications). Information may be passed on to other components of the device 605. The receiver 610 may utilize a single antenna or a plurality of antennas.

The transmitter 615 may provide a means for transmitting signals generated by other components of the device 605. In some examples, the transmitter 615 may be co-located with a receiver 610 in a transceiver module. The transmitter 615 may utilize a single antenna or a plurality of antennas.

The device 605, or various components thereof, may be an example of means for performing various aspects of differential reporting for full-duplex multi-beam communications as described herein. For example, the communication manager 620 may include a full table manager 625, a change manager 630, a differential table manager 635, or any combination thereof. The communication manager 620 may be an example of aspects of a communication manager 520 as described herein. In some examples, the communication manager 620, or various components thereof, may be configured to perform various operations (e.g., receiving, monitoring, transmitting) using or otherwise in cooperation with the receiver 610, the transmitter 615, or both.

The communication manager 620 may support wireless communication at a first device in accordance with examples as disclosed herein. The full table manager 625 may be configured to provide or support a means for transmitting an indication of a first set of signal strength metrics for signal strengths of transmit beams of a second device using receive beams of the first device and a second set of signal strength metrics for signal strengths of transmit beams of the first device using the receive beams of the first device. The change manager 630 may be configured to provide or support a means for determining, for one or more signal strength metrics in the first set of signal strength metrics, the second set of signal strength metrics, or both, a change in the corresponding signal strength. The differential table manager 635 may be configured to provide or support a means for transmitting, based on the determining, an indication of the change in the corresponding signal strength for each of the one or more signal strength metrics.

Figure 7:
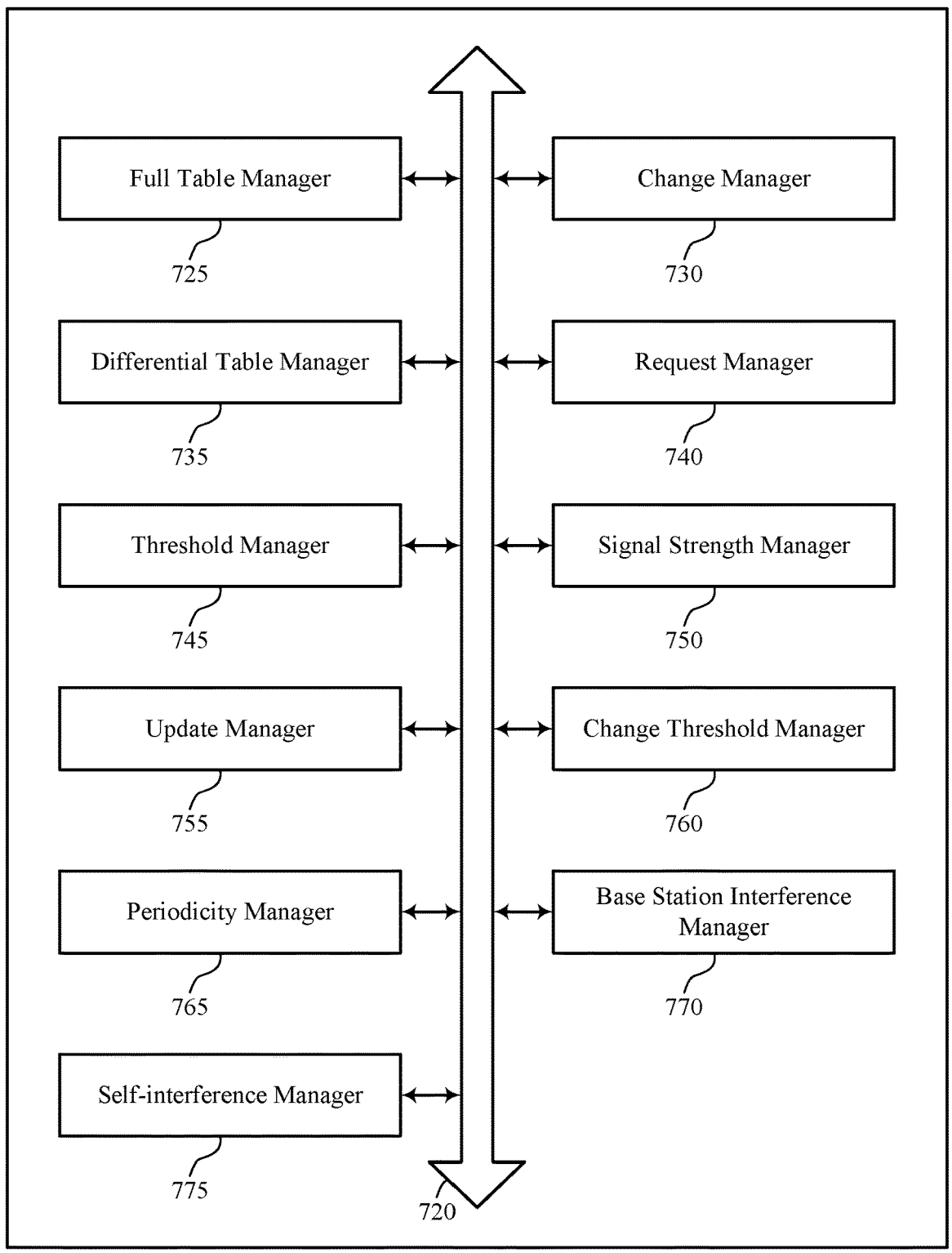
FIG. 7 shows a block diagram of a communication manager that supports differential reporting for full-duplex multi-beam communications in accordance with aspects of the present disclosure.

FIG. 7 shows a block diagram 700 of a communication manager 720 that supports differential reporting for full-duplex multi-beam communications in accordance with aspects of the present disclosure. The communication manager 720 may be an example of aspects of a communication manager 520, a communication manager 620, or both, as described herein. The communication manager 720, or various components thereof, may be an example of means for performing various aspects of differential reporting for full-duplex multi-beam communications as described herein. For example, the communication manager 720 may include a full table manager 725, a change manager 730, a differential table manager 735, a request manager 740, a threshold manager 745, a signal strength manager 750, an update manager 755, a change threshold manager 760, a periodicity manager 765, a base station interference manager 770, a self-interference manager 775, or any combination thereof. Each of these components may communicate, directly or indirectly, with one another (e.g., via one or more buses).

The communication manager 720 may support wireless communication at a first device in accordance with examples as disclosed herein. The full table manager 725 may be configured to provide or support a means for transmitting an indication of a first set of signal strength metrics for signal strengths of transmit beams of a second device using receive beams of the first device and a second set of signal strength metrics for signal strengths of transmit beams of the first device using the receive beams of the first device. The change manager 730 may be configured to provide or support a means for determining, for one or more signal strength metrics in the first set of signal strength metrics, the second set of signal strength metrics, or both, a change in the corresponding signal strength. The differential table manager 735 may be configured to provide or support a means for transmitting, based on the determining, an indication of the change in the corresponding signal strength for each of the one or more signal strength metrics.

In some examples, the request manager 740 may be configured to provide or support a means for receiving a request for an updated first set of signal strength metrics, an updated second set of signal strength metrics, or both, where the indication of the change is transmitted based on the request.

In some examples, to the determine, the threshold manager 745 may be configured to provide or support a means for determining, for the one or more signal strength metrics in the first set of signal strength metrics, the second set of signal strength metrics, or both, that the corresponding signal strength indicated in the first set of signal strength metrics and the second set of signal strength metrics satisfies a threshold. In some examples, to the determine, the threshold manager 745 may be configured to provide or support a means for determining that an updated corresponding signal strength for the one or more signal strength metrics fails to satisfy the threshold, where the indication of the change includes the one or more signal strength metrics based on the updated corresponding signal strength failing to satisfy the threshold.

In some examples, to the determine, the threshold manager 745 may be configured to provide or support a means for determining, for the one or more signal strength metrics in the first set of signal strength metrics, the second set of signal strength metrics, or both, that the corresponding signal strength indicated in the first set of signal strength metrics and the second set of signal strength metrics fails to satisfy a threshold. In some examples, to the determine, the threshold manager 745 may be configured to provide or support a means for determining that an updated corresponding signal strength for the one or more signal strength metrics satisfies the threshold, where the indication of the change includes the one or more signal strength metrics based on the updated corresponding signal strength satisfying the threshold.

In some examples, the signal strength manager 750 may be configured to provide or support a means for receiving a request for an updated first set of signal strength metrics and an updated second set of signal strength metrics. In some examples, the signal strength manager 750 may be configured to provide or support a means for updating the first set of signal strength metrics based on measuring a reference signal transmitted by the second device using each of a set of transmit beams of the second device on a per-receive beam of the first device basis. In some examples, the signal strength manager 750 may be configured to provide or support a means for updating the second set of signal strength metrics based on measuring a reference signal transmitted by the first device using each of a set of transmit beams of the first device on a per-receive beam of the first device basis. In some examples, the signal strength manager 750 may be configured to provide or support a means for transmitting an indication of the updated first set of signal strength metrics and the updated second set of signal strength metrics.

In some examples, the update manager 755 may be configured to provide or support a means for determining that the change in the signal strength for the corresponding signal strength metrics in the first set of signal strength metrics and the second set of signal strength metrics fails to satisfy a change threshold. In some examples, the update manager 755 may be configured to provide or support a means for transmitting a request to transmit an indication of the change based on the change failing to satisfy the change threshold.

In some examples, the change threshold manager 760 may be configured to provide or support a means for determining that the change in the signal strength for the corresponding signal strength metrics in the first set of signal strength metrics and the second set of signal strength metrics satisfies a change threshold. In some examples, the change threshold manager 760 may be configured to provide or support a means for transmitting a request to transmit an indication of the first set of signal strength metrics and the second set of signal strength metrics based on the change satisfying the change threshold.

In some examples, the periodicity manager 765 may be configured to provide or support a means for transmitting, based on the change in the corresponding signal strength, a request to change a periodicity for transmitting the indication of the change.

In some examples, the base station interference manager 770 may be configured to provide or support a means for measuring a signal strength of a reference signal transmitted by the second device using each of a set of transmit beams of the second device on a per-receive beam of the first device basis. In some examples, the base station interference manager 770 may be configured to provide or support a means for comparing each measured signal strength to a corresponding signal strength in the first set of signal strength metrics. In some examples, the base station interference manager 770 may be configured to provide or support a means for determining that the change from the corresponding signal strength to the measured signal strength for the one or more signal strength metrics satisfies a threshold.

In some examples, the self-interference manager 775 may be configured to provide or support a means for measuring a signal strength of a reference signal transmitted by the first device using each of a set of transmit beams of the first device on a per-receive beam of the first device basis. In some examples, the self-interference manager 775 may be configured to provide or support a means for comparing each measured signal strength to a corresponding signal strength in the second set of signal strength metrics. In some examples, the self-interference manager 775 may be configured to provide or support a means for determining that the change from the corresponding signal strength to the measured signal strength for the one or more signal strength metrics satisfies a threshold.

Figure 8:
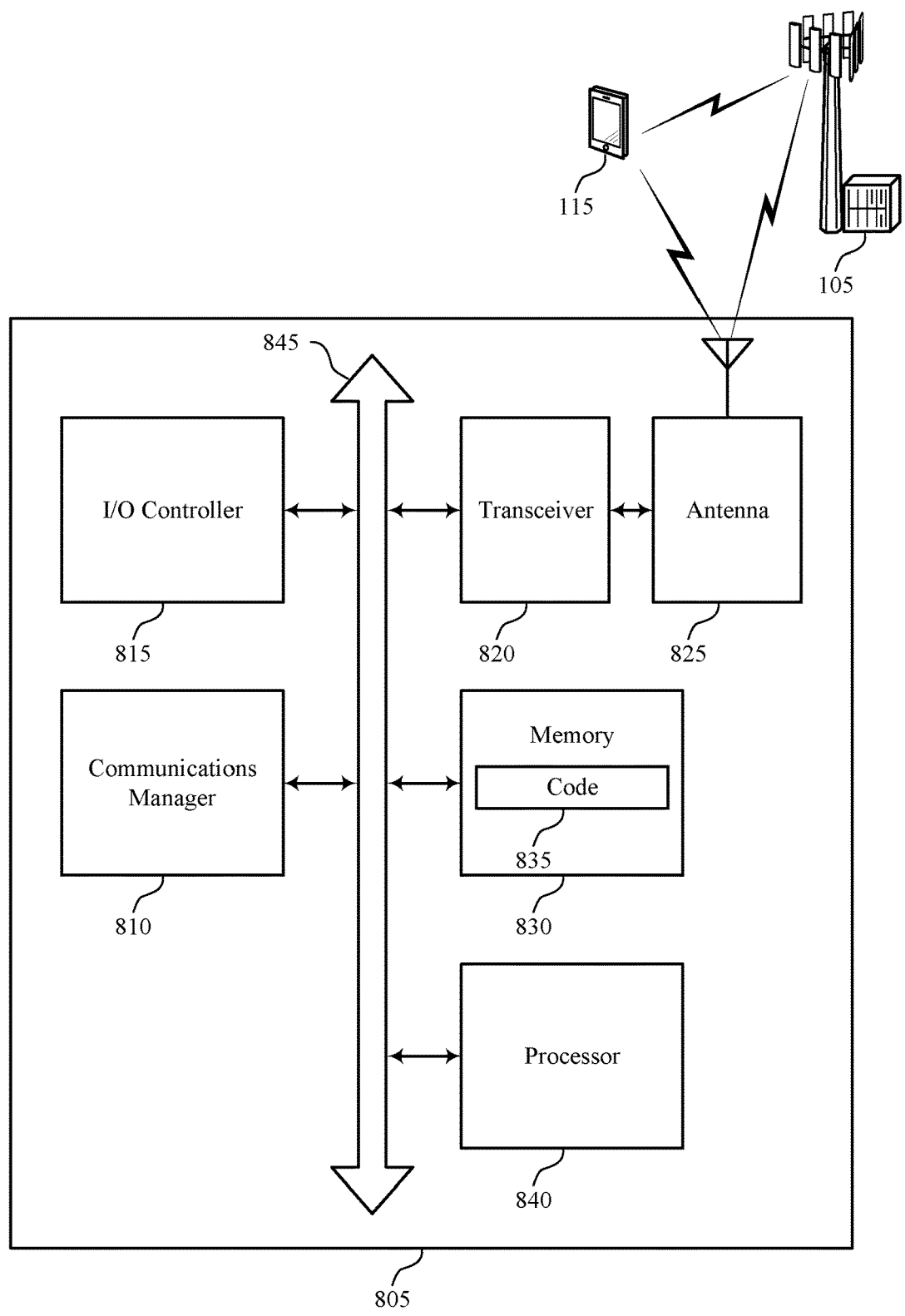
FIG. 8 shows a diagram of a system including a device that supports differential reporting for full-duplex multi-beam communications in accordance with aspects of the present disclosure.

FIG. 8 shows a diagram of a system 800 (e.g., a first device) including a device 805 that supports differential reporting for full-duplex multi-beam communications in accordance with aspects of the present disclosure. The device 805 may be an example of or include the components of device 705, device 605, base station 105, or a UE 115 as described herein. The device 805 may communicate wirelessly with one or more base stations 105, UEs 115, or any combination thereof. The device 805 may include components for bi-directional voice and data communications including components for transmitting and receiving communications, including a communication manager 810, a I/O controller 815, a transceiver 820, an antenna 825, a memory 830, a code 835, and a processor 840. These components may be in electronic communication or otherwise coupled (e.g., operatively, communicatively, functionally, electronically, electrically) via one or more buses (e.g., bus 845).

The I/O controller 815 may manage input and output signals for device 805. The I/O controller 815 may also manage peripherals not integrated into device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with device 805 via the I/O controller 815 or via hardware components controlled by the I/O controller 815.

In some cases, the device 805 may include a single antenna 825. However, in some cases the device may have more than one antenna 825, which may be capable of concurrently transmitting or receiving multiple wireless transmissions. The transceiver 820 may communicate bi-directionally, via the one or more antennas 825, wired, or wireless links as described herein. For example, the transceiver 820 may represent a wireless transceiver and may communicate bi-directionally with another wireless transceiver. The transceiver 820 may also include a modem to modulate the packets and provide the modulated packets to one or more antennas 825 for transmission, and to demodulate packets received from the one or more antennas 825. The transceiver 820, or the transceiver 820 and one or more antennas 825, may be an example of a transmitter 515, a transmitter 615, a receiver 510, a receiver 610, or any combination thereof or component thereof, as described herein.

The memory 830 may include random-access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or other type of memory. In some cases, the code 835 may not be directly executable by the processor 840 but may cause a computer (e.g., when compiled and executed) to perform functions described herein. In some cases, the memory 830 may contain, among other things, a basic input/output system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting differential reporting for full-duplex multi-beam communications).

The communication manager 810 may support wireless communication at a first device in accordance with examples as disclosed herein. For example, the communication manager 810 may be configured to provide or support a means for transmitting an indication of a first set of signal strength metrics for signal strengths of transmit beams of a second device using receive beams of the first device and a second set of signal strength metrics for signal strengths of transmit beams of the first device using the receive beams of the first device. The communication manager 810 may be configured to provide or support a means for determining, for one or more signal strength metrics in the first set of signal strength metrics, the second set of signal strength metrics, or both, a change in the corresponding signal strength. The communication manager 810 may be configured to provide or support a means for transmitting, based on the determining, an indication of the change in the corresponding signal strength for each of the one or more signal strength metrics.

By including or configuring the communication manager 810 in accordance with examples as described herein, the device 805 may support improved techniques for reduced signaling overhead, improved link/beam management/optimizations, improved latency, etc.

In some examples, the communication manager 810 may be configured to perform various operations (e.g., receiving, monitoring, transmitting) using or otherwise in cooperation with the transceiver 820, the one or more antennas 825, or any combination thereof. Although the communication manager 810 is illustrated as a separate component, in some examples, one or more functions described with reference to the communication manager 810 may be supported by or performed by the processor 840, the memory 830, the code 835, or any combination thereof. For example, the code 835 may include instructions executable by the processor 840 to cause the device 805 to perform various aspects of differential reporting for full-duplex multi-beam communications as described herein, or the processor 840 and the memory 830 may be otherwise configured to perform or support such operations.

Figure 9:
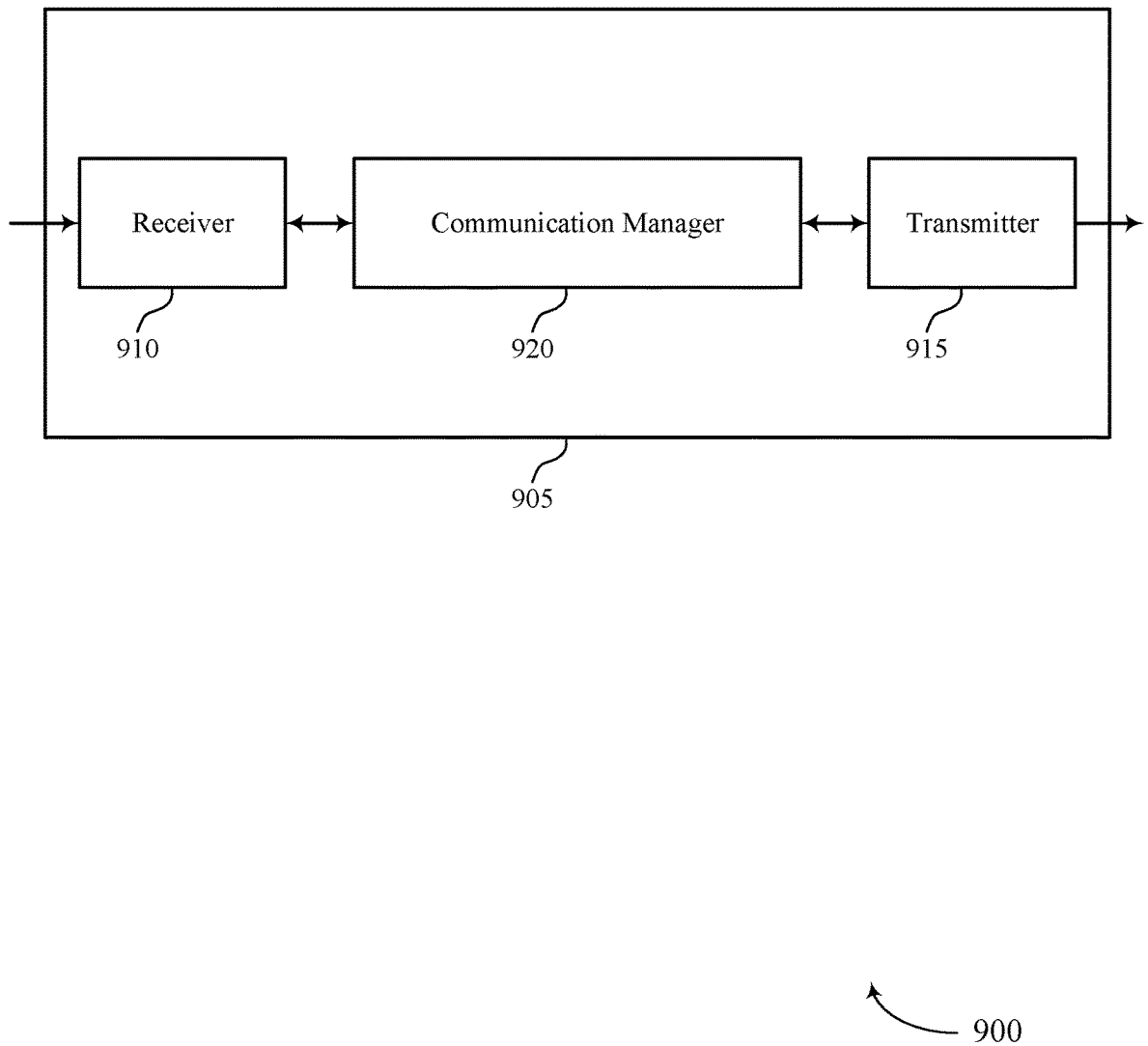
FIGS. 9 and 10 show block diagrams of devices that support differential reporting for full-duplex multi-beam communications in accordance with aspects of the present disclosure.

FIG. 9 shows a block diagram 900 of a device 905 (e.g., a second device) that supports differential reporting for full-duplex multi-beam communications in accordance with aspects of the present disclosure. The device 905 may be an example of aspects of a base station 105 or a UE 115 as described herein. The device 905 may include a receiver 910, a transmitter 915, and a communication manager 920. The device 905 may also include a processor. Each of these components may be in communication with one another (e.g., via one or more buses).

The receiver 910 may provide a means for receiving information such as packets, user data, or control information associated with various information channels (e.g., control channels, data channels, information related to differential reporting for full-duplex multi-beam communications). Information may be passed on to other components of the device 905. The receiver 910 may utilize a single antenna or a plurality of antennas.

The transmitter 915 may provide a means for transmitting signals generated by other components of the device 905. In some examples, the transmitter 915 may be co-located with a receiver 910 in a transceiver module. The transmitter 915 may utilize a single antenna or a plurality of antennas.

The communication manager 920, the receiver 910, the transmitter 915, or various combinations thereof or various components thereof, may be an example of a means for performing various aspects of differential reporting for full-duplex multi-beam communications as described herein.

In some examples, the communication manager 920, the receiver 910, the transmitter 915, or various combinations thereof or components thereof, may be implemented in hardware (e.g., in communications management circuitry). The circuitry may include a processor, a DSP, an ASIC, a FPGA or other programmable logic device, discrete gate or transistor logic, discrete hardware components, or any combination thereof designed to perform the functions described in the present disclosure.

Additionally or alternatively, in some examples, the communication manager 920, the receiver 910, the transmitter 915, or various combinations thereof or components thereof, may be implemented in code (e.g., as communications management software or firmware) executed by a processor. If implemented in code executed by a processor, the functions of the communication manager 920, the receiver 910, the transmitter 915, or various combinations thereof or components thereof, may be executed by a general-purpose processor, a DSP, a CPU, an ASIC, an FPGA, or some other programmable logic device.

In some examples, the communication manager 920 may be configured to perform various operations (e.g., receiving, monitoring, transmitting) using or otherwise in cooperation with the receiver 910, the transmitter 915, or both.

The communication manager 920 may support wireless communication at a second device in accordance with examples as disclosed herein. For example, the communication manager 920 may be configured to provide or support a means for receiving, from a first device, an indication of a first set of signal strength metrics for signal strengths of transmit beams of the second device using receive beams of the first device and a second set of signal strength metrics for signal strengths of transmit beams of the first device using the receive beams of the first device. The communication manager 920 may be configured to provide or support a means for receiving, from the first device, an indication of a change in a corresponding signal strength for each of one or more signal strength metrics in the first set of signal strength metrics, the second set of signal strength metrics, or both, the change based at least in part on the corresponding signal strength. The communication manager 920 may be configured to provide or support a means for selecting one or more transmit beams of the second device to use for communicating with the first device based at least in part on the indication. The communication manager 920 may be configured to provide or support a means for communicating with the first device using the one or more transmit beams of the second device.

By including or configuring the communication manager 920 in accordance with examples as described herein, the device 905 may support improved techniques for reduced signaling overhead, improved link/beam management/optimizations, improved latency, etc.

Figure 10:
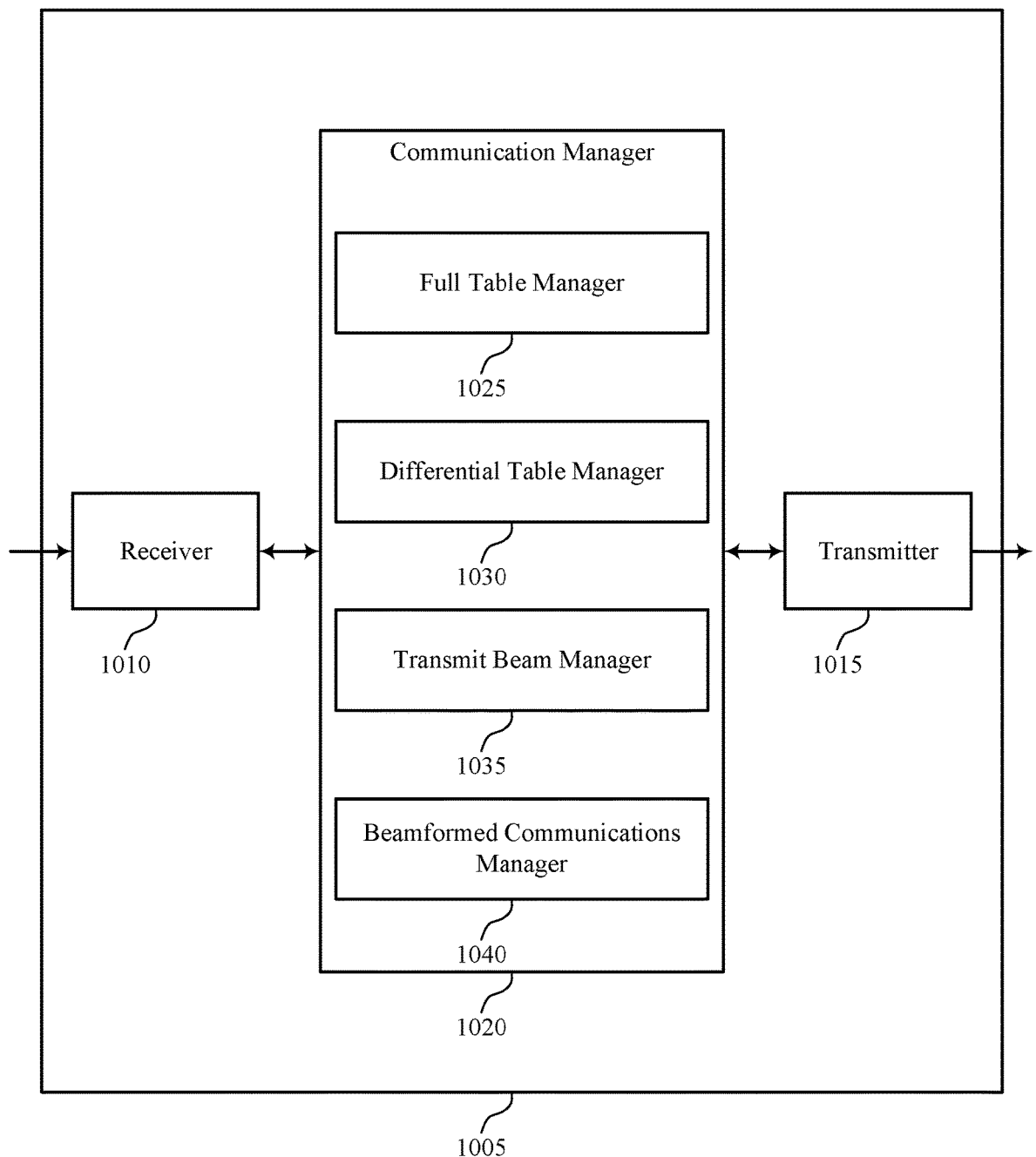

FIG. 10 shows a block diagram 1000 of a device 1005 (e.g., a second device) that supports differential reporting for full-duplex multi-beam communications in accordance with aspects of the present disclosure. The device 1005 may be an example of aspects of a device 905, a UE 115, or a base station 105 as described herein. The device 1005 may include a receiver 1010, a transmitter 1015, and a communication manager 1020. The device 1005 may also include a processor. Each of these components may be in communication with one another (e.g., via one or more buses).

The receiver 1010 may provide a means for receiving information such as packets, user data, or control information associated with various information channels (e.g., control channels, data channels, information related to differential reporting for full-duplex multi-beam communications). Information may be passed on to other components of the device 1005. The receiver 1010 may utilize a single antenna or a plurality of antennas.

The transmitter 1015 may provide a means for transmitting signals generated by other components of the device 1005. In some examples, the transmitter 1015 may be co-located with a receiver 1010 in a transceiver module. The transmitter 1015 may utilize a single antenna or a plurality of antennas.

The device 1005, or various components thereof, may be an example of means for performing various aspects of differential reporting for full-duplex multi-beam communications as described herein. For example, the communication manager 1020 may include a full table manager 1025, a differential table manager 1030, a transmit beam manager 1035, a beamformed communications manager 1040, or any combination thereof. The communication manager 1020 may be an example of aspects of a communication manager 920 as described herein. In some examples, the communication manager 1020, or various components thereof, may be configured to perform various operations (e.g., receiving, monitoring, transmitting) using or otherwise in cooperation with the receiver 1010, the transmitter 1015, or both.

The communication manager 1020 may support wireless communication at a second device in accordance with examples as disclosed herein. The full table manager 1025 may be configured to provide or support a means for receiving, from a first device, an indication of a first set of signal strength metrics for signal strengths of transmit beams of the second device using receive beams of the first device and a second set of signal strength metrics for signal strengths of transmit beams of the first device using the receive beams of the first device. The differential table manager 1030 may be configured to provide or support a means for receiving, from the first device, an indication of a change in a corresponding signal strength for each of one or more signal strength metrics in the first set of signal strength metrics, the second set of signal strength metrics, or both, the change based on the corresponding signal strength. The transmit beam manager 1035 may be configured to provide or support a means for selecting one or more transmit beams of the second device to use for communicating with the first device based on the indication. The beamformed communications manager 1040 may be configured to provide or support a means for communicating with the UE using the one or more transmit beams of the base station.

Figure 11:
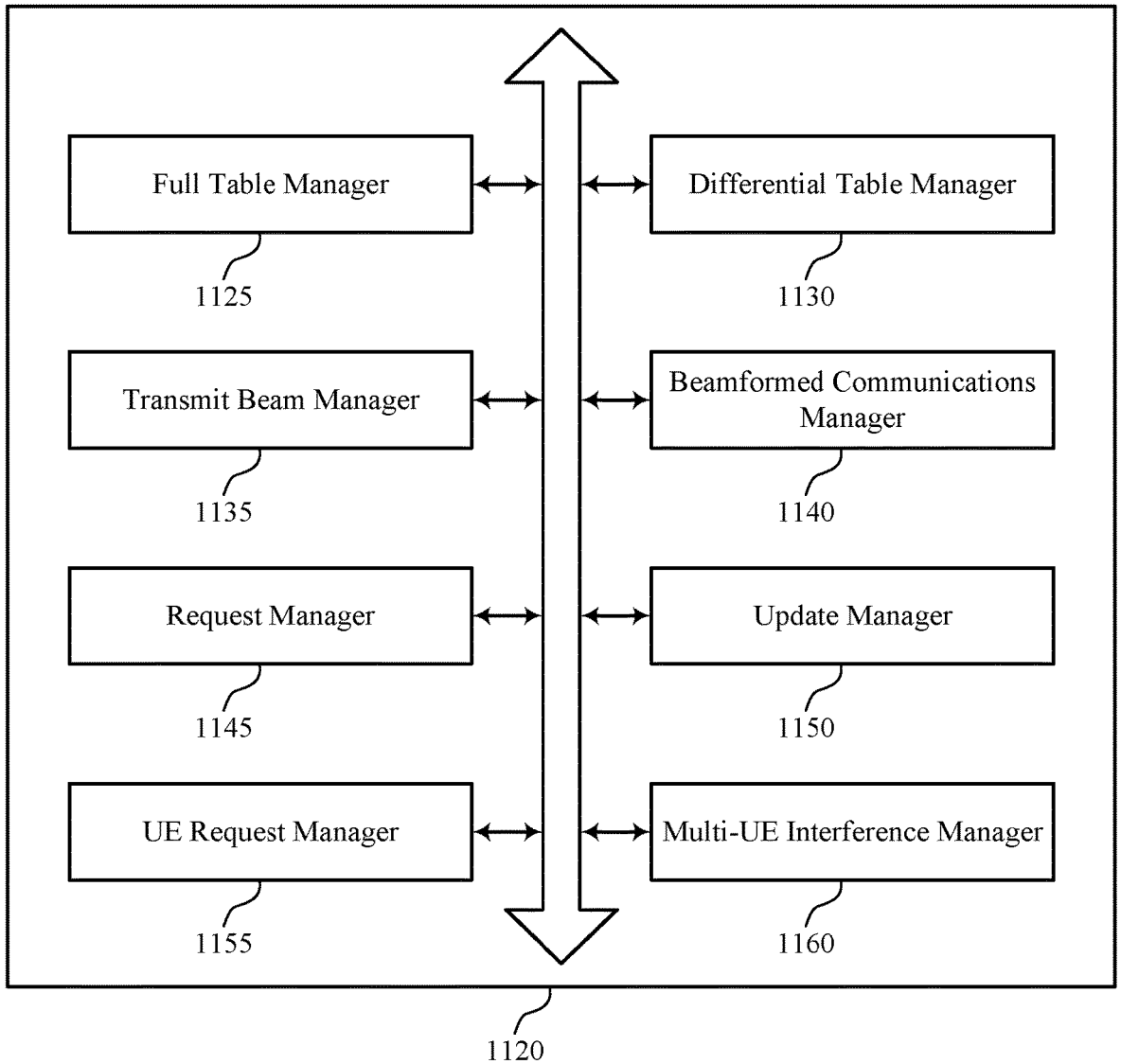
FIG. 11 shows a block diagram of a communication manager that supports differential reporting for full-duplex multi-beam communications in accordance with aspects of the present disclosure.

FIG. 11 shows a block diagram 1100 of a communication manager 1120 that supports differential reporting for full-duplex multi-beam communications in accordance with aspects of the present disclosure. The communication manager 1120 may be an example of aspects of a communication manager 920, a communication manager 1020, or both, as described herein. The communication manager 1120, or various components thereof, may be an example of means for performing various aspects of differential reporting for full-duplex multi-beam communications as described herein. For example, the communication manager 1120 may include a full table manager 1125, a differential table manager 1130, a transmit beam manager 1135, a beamformed communications manager 1140, a request manager 1145, an update manager 1150, a UE request manager 1155, a multi-UE interference manager 1160, or any combination thereof. Each of these components may communicate, directly or indirectly, with one another (e.g., via one or more buses).

The communication manager 1120 may support wireless communication at a second device in accordance with examples as disclosed herein. The full table manager 1125 may be configured to provide or support a means for receiving, from a first device, an indication of a first set of signal strength metrics for signal strengths of transmit beams of the second device using receive beams of the first device and a second set of signal strength metrics for signal strengths of transmit beams of the first device using the receive beams of the first device. The differential table manager 1130 may be configured to provide or support a means for receiving, from the first device, an indication of a change in a corresponding signal strength for each of one or more signal strength metrics in the first set of signal strength metrics, the second set of signal strength metrics, or both, the change based on the corresponding signal strength. The transmit beam manager 1135 may be configured to provide or support a means for selecting one or more transmit beams of the second device to use for communicating with the first device based on the indication. The beamformed communications manager 1140 may be configured to provide or support a means for communicating with the first device using the one or more transmit beams of the second device.

In some examples, the request manager 1145 may be configured to provide or support a means for transmitting a request for an updated first set of signal strength metrics, an updated second set of signal strength metrics, or both, where the indication of the change is received based on the request. In some examples, transmitting a request for an updated first set of signal strength metrics and an updated second set of signal strength metrics. In some examples, receiving an indication of an updated first set of signal strength metrics and an updated second set of signal strength metrics from the first device based on the request.

In some examples, the UE request manager 1155 may be configured to provide or support a means for receiving, from the first device, a request for the first device to transmit the indication of the change based on the change failing to satisfy a change threshold. In some examples, the UE request manager 1155 may be configured to provide or support a means for receiving, from the first device, a request for the UE to transmit an indication of the first set of signal strength metrics and the second set of signal strength metrics based on the change satisfying a change threshold.

In some examples, the multi-UE interference manager 1160 may be configured to provide or support a means for receiving, from a third device, an indication of a third set of signal strength metrics for signal strengths of transmit beams of the second device using receive beams of the third device and a fourth set of signal strength metrics for signal strengths of transmit beams of the third device using receive beams of the third device, where selecting the one or more transmit beams of the second device to use for communicating with the first device is based on the third set of signal strength metrics, the fourth set of signal strength metrics, or both.

Figure 12:
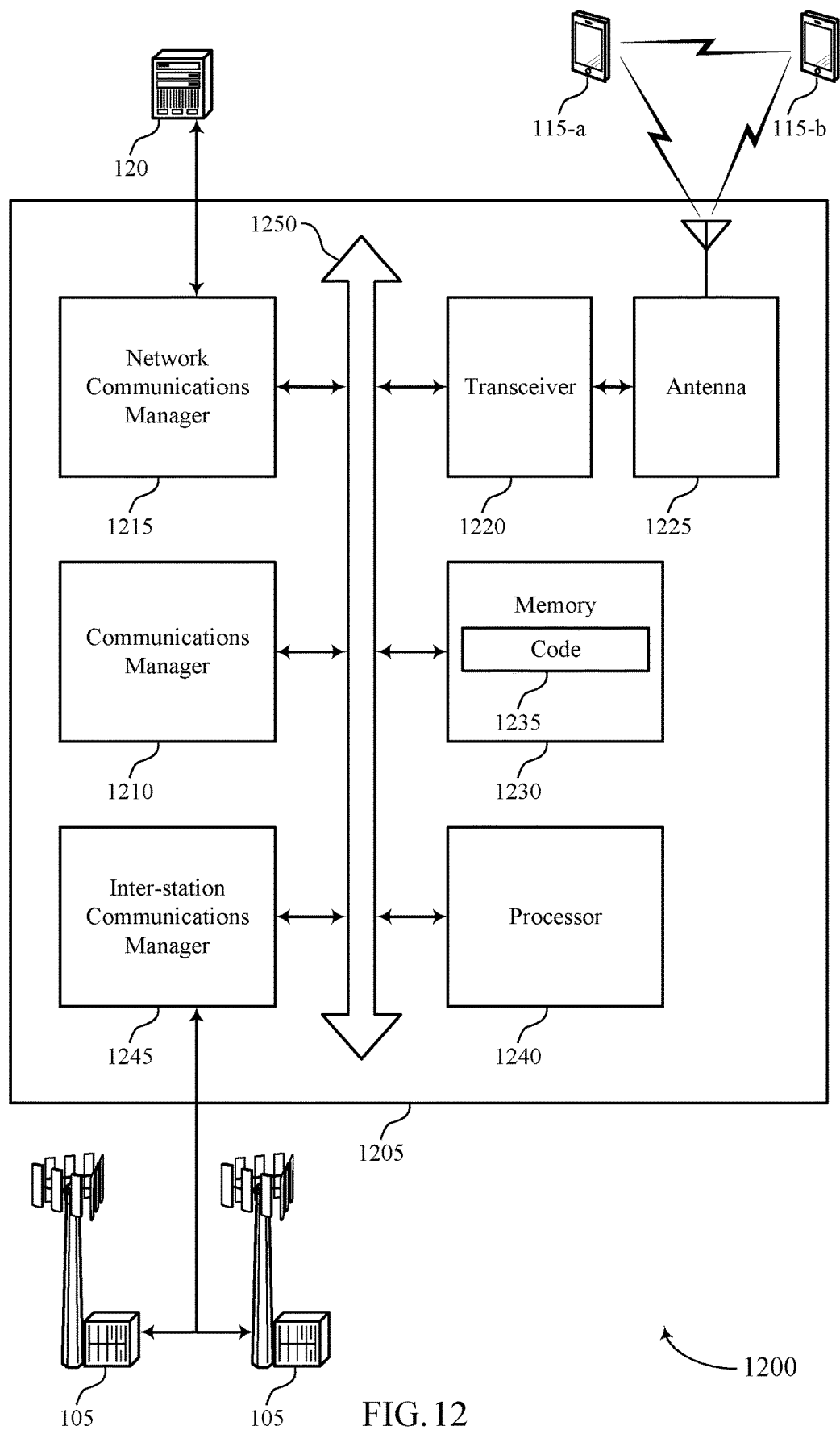
FIG. 12 shows a diagram of a system including a device that supports differential reporting for full-duplex multi-beam communications in accordance with aspects of the present disclosure.

FIG. 12 shows a diagram of a system 1200 including a device 1205 (e.g., a second device) that supports differential reporting for full-duplex multi-beam communications in accordance with aspects of the present disclosure. The device 1205 may be an example of or include the components of device 1105, device 1005, UE 115, or a base station 105 as described herein. The device 1205 may communicate wirelessly with one or more base stations 105, UEs 115, or any combination thereof. The device 1205 may include components for bi-directional voice and data communications including components for transmitting and receiving communications, including a communication manager 1210, a network communications manager 1215, a transceiver 1220, an antenna 1225, a memory 1230, a code 1235, a processor 1240, and an inter-station communications manager 1245. These components may be in electronic communication or otherwise coupled (e.g., operatively, communicatively, functionally, electronically, electrically) via one or more buses (e.g., bus 1250).

The network communications manager 1215 may manage communications with the core network (e.g., via one or more wired backhaul links). For example, the network communications manager 1215 may manage the transfer of data communications for client devices, such as one or more UEs 115.

In some cases, the device 1205 may include a single antenna 1225. However, in some cases the device may have more than one antenna 1225, which may be capable of concurrently transmitting or receiving multiple wireless transmissions. The transceiver 1220 may communicate bi-directionally, via the one or more antennas 1225, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to one or more antennas 1225 for transmission, and to demodulate packets received from the one or more antennas 1225. The transceiver 1220, or the transceiver 1220 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting differential reporting for full-duplex multi-beam communications).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The communication manager 1210 may support wireless communication at a second device in accordance with examples as disclosed herein. For example, the communication manager 1210 may be configured to provide or support a means for receiving, from a first device, an indication of a first set of signal strength metrics for signal strengths of transmit beams of the second device using receive beams of the first device and a second set of signal strength metrics for signal strengths of transmit beams of the first device using the receive beams of the first device. The communication manager 1210 may be configured to provide or support a means for receiving, from the first device, an indication of a change in a corresponding signal strength for each of one or more signal strength metrics in the first set of signal strength metrics, the second set of signal strength metrics, or both, the change based on the corresponding signal strength. The communication manager 1210 may be configured to provide or support a means for selecting one or more transmit beams of the second device to use for communicating with the first device based on the indication. The communication manager 1210 may be configured to provide or support a means for communicating with the first device using the one or more transmit beams of the second device.

By including or configuring the communication manager 1210 in accordance with examples as described herein, the device 1205 may support improved techniques for reduced signaling overhead, improved link/beam management/optimizations, improved latency, etc.

In some examples, the communication manager 1210 may be configured to perform various operations (e.g., receiving, monitoring, transmitting) using or otherwise in cooperation with the transceiver 1220, the one or more antennas 1225, or any combination thereof. Although the communication manager 1210 is illustrated as a separate component, in some examples, one or more functions described with reference to the communication manager 1210 may be supported by or performed by the processor 1240, the memory 1230, the code 1235, or any combination thereof. For example, the code 1235 may include instructions executable by the processor 1240 to cause the device 1205 to perform various aspects of differential reporting for full-duplex multi-beam communications as described herein, or the processor 1240 and the memory 1230 may be otherwise configured to perform or support such operations.

Figure 13:
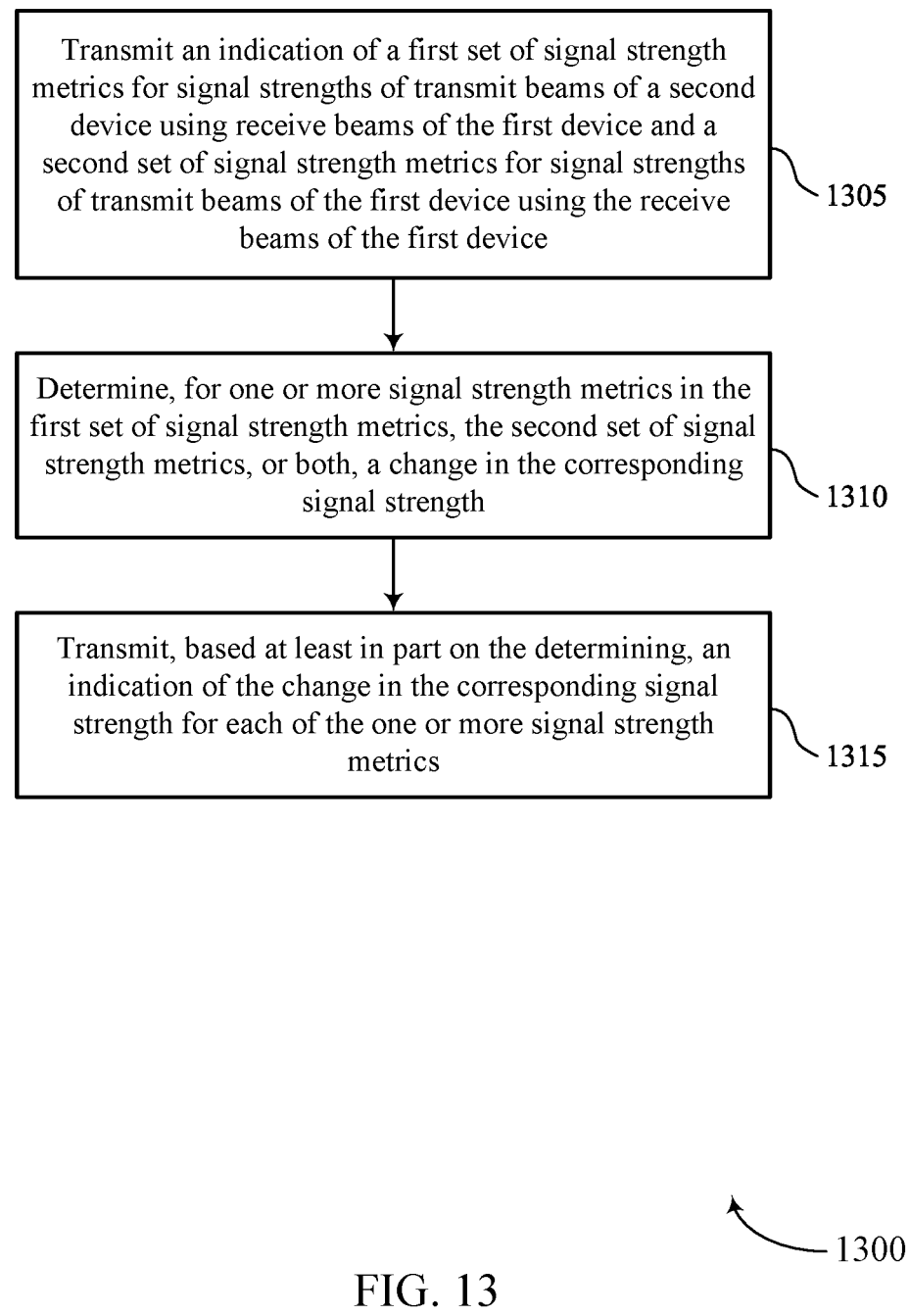
FIGS. 13 through 17 show flowcharts illustrating methods that support differential reporting for full-duplex multi-beam communications in accordance with aspects of the present disclosure.

FIG. 13 shows a flowchart illustrating a method 1300 for differential reporting for full-duplex multi-beam communications in accordance with aspects of the present disclosure. The operations of method 1300 may be implemented by a first device (e.g., a UE or base station) or its components as described herein. For example, the operations of method 1300 may be performed by a UE 115 or base station 105 as described with reference to FIGS. 1 through 8. In some examples, a first device may execute a set of instructions to control the functional elements of the device to perform the described functions. Additionally or alternatively, the first device may perform aspects of the described functions using special-purpose hardware.

At 1305, the method may include transmitting an indication of a first set of signal strength metrics for signal strengths of transmit beams of a second device using receive beams of the first device and a second set of signal strength metrics for signal strengths of transmit beams of the first device using the receive beams of the first device. The operations of 1305 may be performed according to the methods described herein. In some examples, aspects of the operations of 1305 may be performed by a full table manager 725 as described with reference to FIG. 7.

At 1310, the method may include determining, for one or more signal strength metrics in the first set of signal strength metrics, the second set of signal strength metrics, or both, a change in the corresponding signal strength. The operations of 1310 may be performed according to the methods described herein. In some examples, aspects of the operations of 1310 may be performed by a change manager 730 as described with reference to FIG. 7.

At 1315, the method may include transmitting, based at least in part on the determining, an indication of the change in the corresponding signal strength for each of the one or more signal strength metrics. The operations of 1315 may be performed according to the methods described herein. In some examples, aspects of the operations of 1315 may be performed by a differential table manager 735 as described with reference to FIG. 7.

Figure 14:
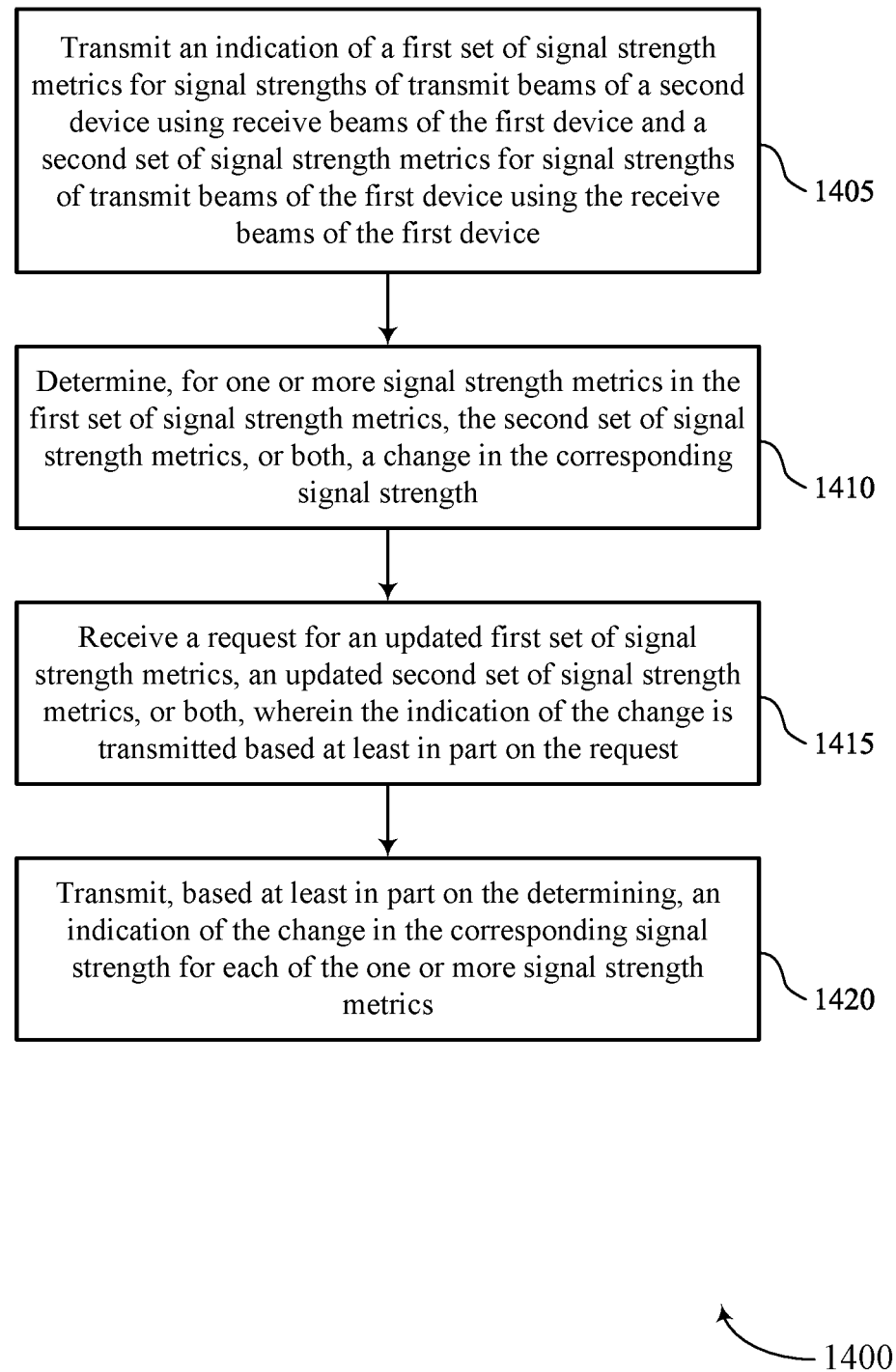

FIG. 14 shows a flowchart illustrating a method 1400 for differential reporting for full-duplex multi-beam communications in accordance with aspects of the present disclosure. The operations of method 1400 may be implemented by a first device (e.g., a UE or base station) or its components as described herein. For example, the operations of method 1400 may be performed by a UE 115 or base station 105 as described with reference to FIGS. 1 through 8. In some examples, a first device may execute a set of instructions to control the functional elements of the device to perform the described functions. Additionally or alternatively, the first device may perform aspects of the described functions using special-purpose hardware.

At 1405, the method may include transmitting an indication of a first set of signal strength metrics for signal strengths of transmit beams of a second device using receive beams of the first device and a second set of signal strength metrics for signal strengths of transmit beams of the first device using the receive beams of the first device. The operations of 1405 may be performed according to the methods described herein. In some examples, aspects of the operations of 1405 may be performed by a full table manager 725 as described with reference to FIG. 7.

At 1410, the method may include determining, for one or more signal strength metrics in the first set of signal strength metrics, the second set of signal strength metrics, or both, a change in the corresponding signal strength. The operations of 1410 may be performed according to the methods described herein. In some examples, aspects of the operations of 1410 may be performed by a change manager 730 as described with reference to FIG. 7.

At 1415, the method may include receiving a request for an updated first set of signal strength metrics, an updated second set of signal strength metrics, or both, wherein the indication of the change is transmitted based at least in part on the request. The operations of 1415 may be performed according to the methods described herein. In some examples, aspects of the operations of 1415 may be performed by a request manager 740 as described with reference to FIG. 7.

At 1420, the method may include transmitting, based at least in part on the determining, an indication of the change in the corresponding signal strength for each of the one or more signal strength metrics. The operations of 1420 may be performed according to the methods described herein. In some examples, aspects of the operations of 1420 may be performed by a differential table manager 735 as described with reference to FIG. 7.

Figure 15:
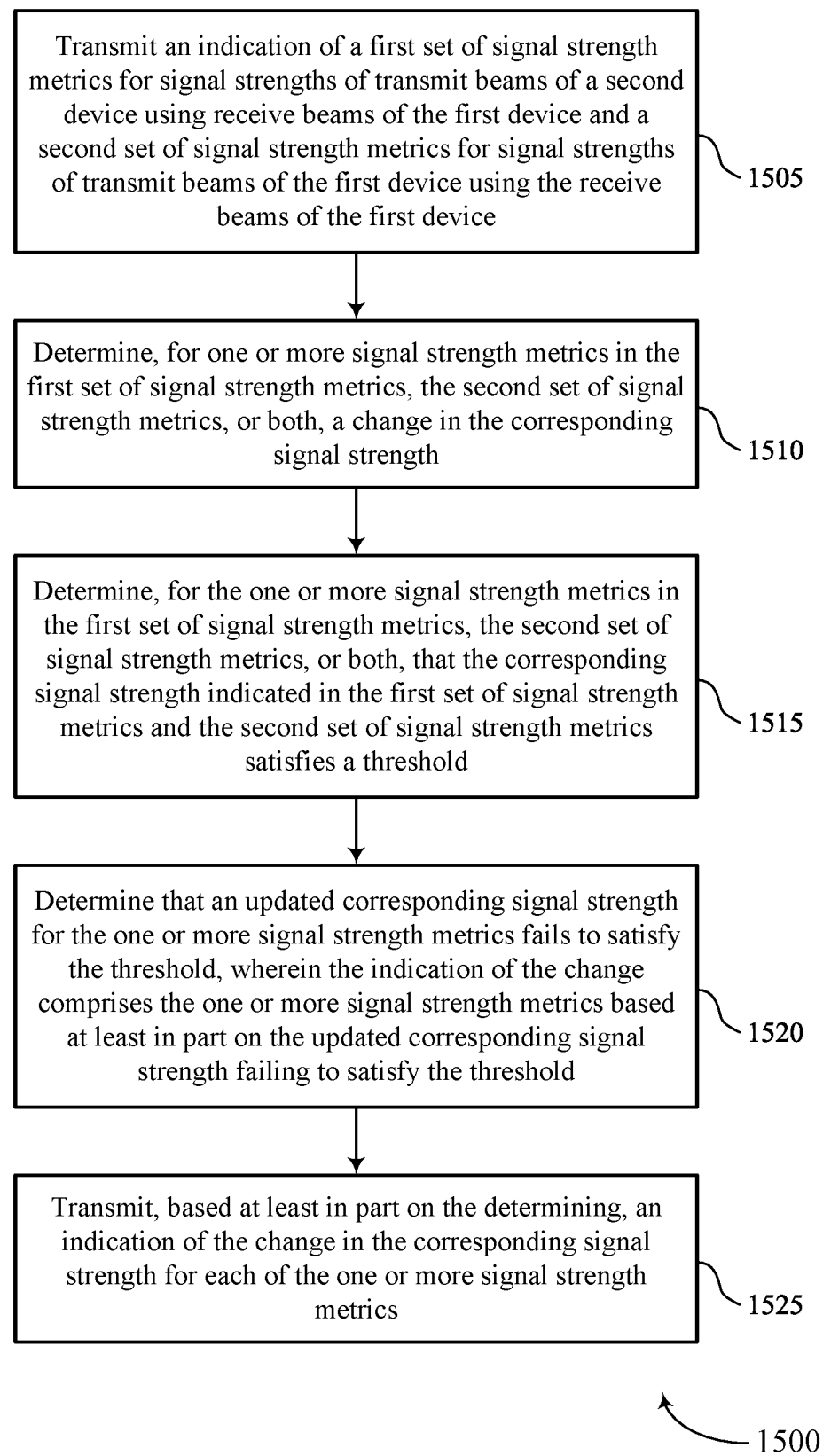

FIG. 15 shows a flowchart illustrating a method 1500 for differential reporting for full-duplex multi-beam communications in accordance with aspects of the present disclosure. The operations of method 1500 may be implemented by a first device (e.g., a UE or base station) or its components as described herein. For example, the operations of method 1500 may be performed by a UE 115 or base station 105 as described with reference to FIGS. 1 through 8. In some examples, a first device may execute a set of instructions to control the functional elements of the device to perform the described functions. Additionally or alternatively, the first device may perform aspects of the described functions using special-purpose hardware.

At 1505, the method may include transmitting an indication of a first set of signal strength metrics for signal strengths of transmit beams of a second device using receive beams of the first device and a second set of signal strength metrics for signal strengths of transmit beams of the first device using the receive beams of the first device. The operations of 1505 may be performed according to the methods described herein. In some examples, aspects of the operations of 1505 may be performed by a full table manager 725 as described with reference to FIG. 7.

At 1510, the method may include determining, for one or more signal strength metrics in the first set of signal strength metrics, the second set of signal strength metrics, or both, a change in the corresponding signal strength. The operations of 1510 may be performed according to the methods described herein. In some examples, aspects of the operations of 1510 may be performed by a change manager 730 as described with reference to FIG. 7.

At 1515, the method may include determining, for the one or more signal strength metrics in the first set of signal strength metrics, the second set of signal strength metrics, or both, that the corresponding signal strength indicated in the first set of signal strength metrics and the second set of signal strength metrics satisfies a threshold. The operations of 1515 may be performed according to the methods described herein. In some examples, aspects of the operations of 1515 may be performed by a threshold manager 745 as described with reference to FIG. 7.

At 1520, the method may include determining that an updated corresponding signal strength for the one or more signal strength metrics fails to satisfy the threshold, wherein the indication of the change comprises the one or more signal strength metrics based at least in part on the updated corresponding signal strength failing to satisfy the threshold. The operations of 1520 may be performed according to the methods described herein. In some examples, aspects of the operations of 1520 may be performed by a threshold manager 745 as described with reference to FIG. 7.

At 1525, the method may include transmitting, based at least in part on the determining, an indication of the change in the corresponding signal strength for each of the one or more signal strength metrics. The operations of 1525 may be performed according to the methods described herein. In some examples, aspects of the operations of 1525 may be performed by a differential table manager 735 as described with reference to FIG. 7.

Figure 16:
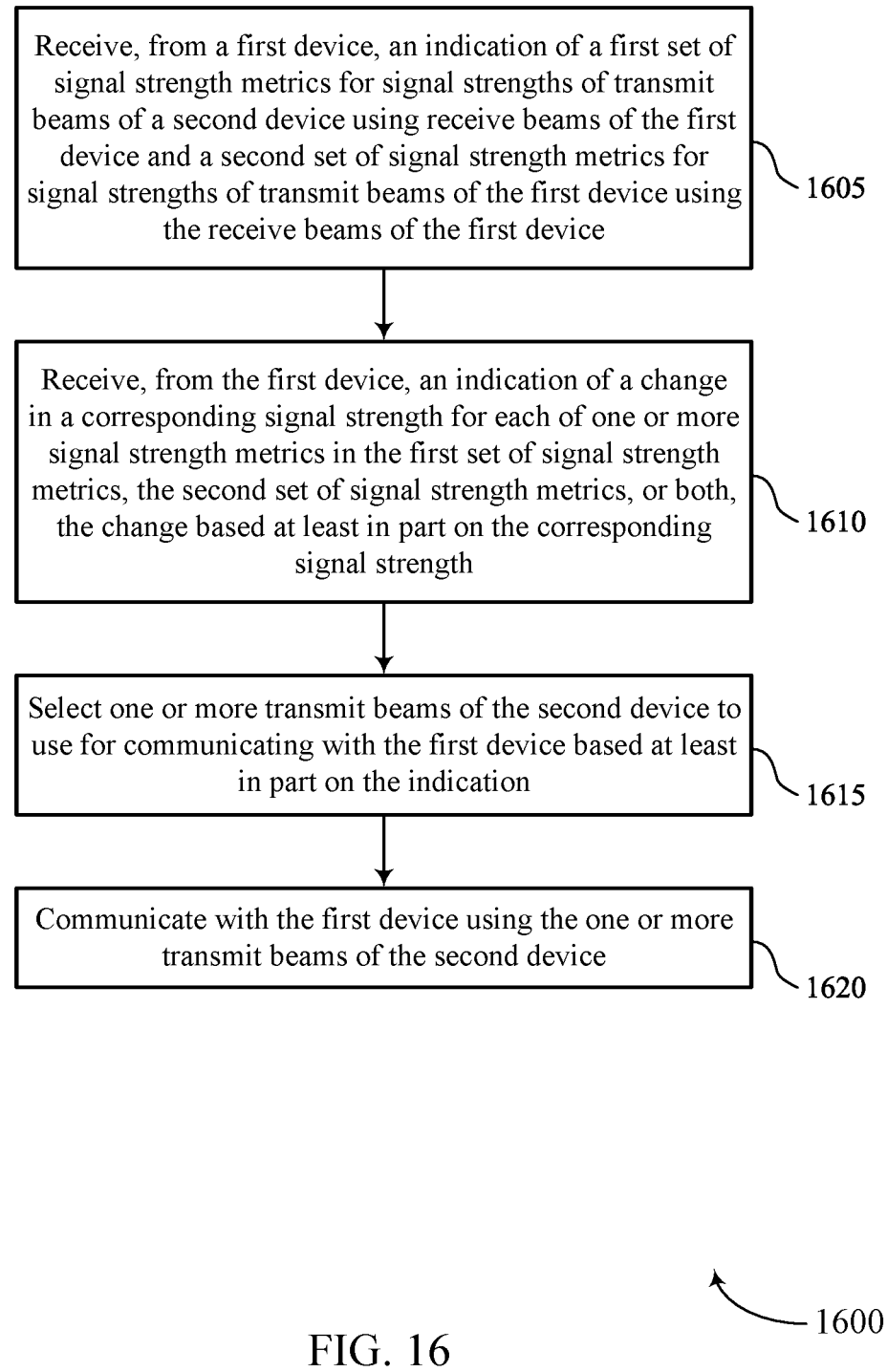

FIG. 16 shows a flowchart illustrating a method 1600 for differential reporting for full-duplex multi-beam communications in accordance with aspects of the present disclosure. The operations of method 1600 may be implemented by a second device (e.g., a UE or base station) or its components as described herein. For example, the operations of method 1600 may be performed by a UE 115 or base station 105 as described with reference to FIGS. 1 through 4 and 9 through 12. In some examples, a second device may execute a set of instructions to control the functional elements of the device to perform the described functions. Additionally or alternatively, the second device may perform aspects of the described functions using special-purpose hardware.

At 1605, the method may include receiving, from a first device, an indication of a first set of signal strength metrics for signal strengths of transmit beams of a second device using receive beams of the first device and a second set of signal strength metrics for signal strengths of transmit beams of the first device using the receive beams of the first device. The operations of 1605 may be performed according to the methods described herein. In some examples, aspects of the operations of 1605 may be performed by a full table manager 1125 as described with reference to FIG. 11.

At 1610, the method may include receiving, from the first device, an indication of a change in a corresponding signal strength for each of one or more signal strength metrics in the first set of signal strength metrics, the second set of signal strength metrics, or both, the change based at least in part on the corresponding signal strength. The operations of 1610 may be performed according to the methods described herein. In some examples, aspects of the operations of 1610 may be performed by a differential table manager 1130 as described with reference to FIG. 11.

At 1615, the method may include selecting one or more transmit beams of the second device to use for communicating with the first device based at least in part on the indication. The operations of 1615 may be performed according to the methods described herein. In some examples, aspects of the operations of 1615 may be performed by a transmit beam manager 1135 as described with reference to FIG. 11.

At 1620, the method may include communicating with the first device using the one or more transmit beams of the second device. The operations of 1620 may be performed according to the methods described herein. In some examples, aspects of the operations of 1620 may be performed by a beamformed communications manager 1140 as described with reference to FIG. 11.

Figure 17:
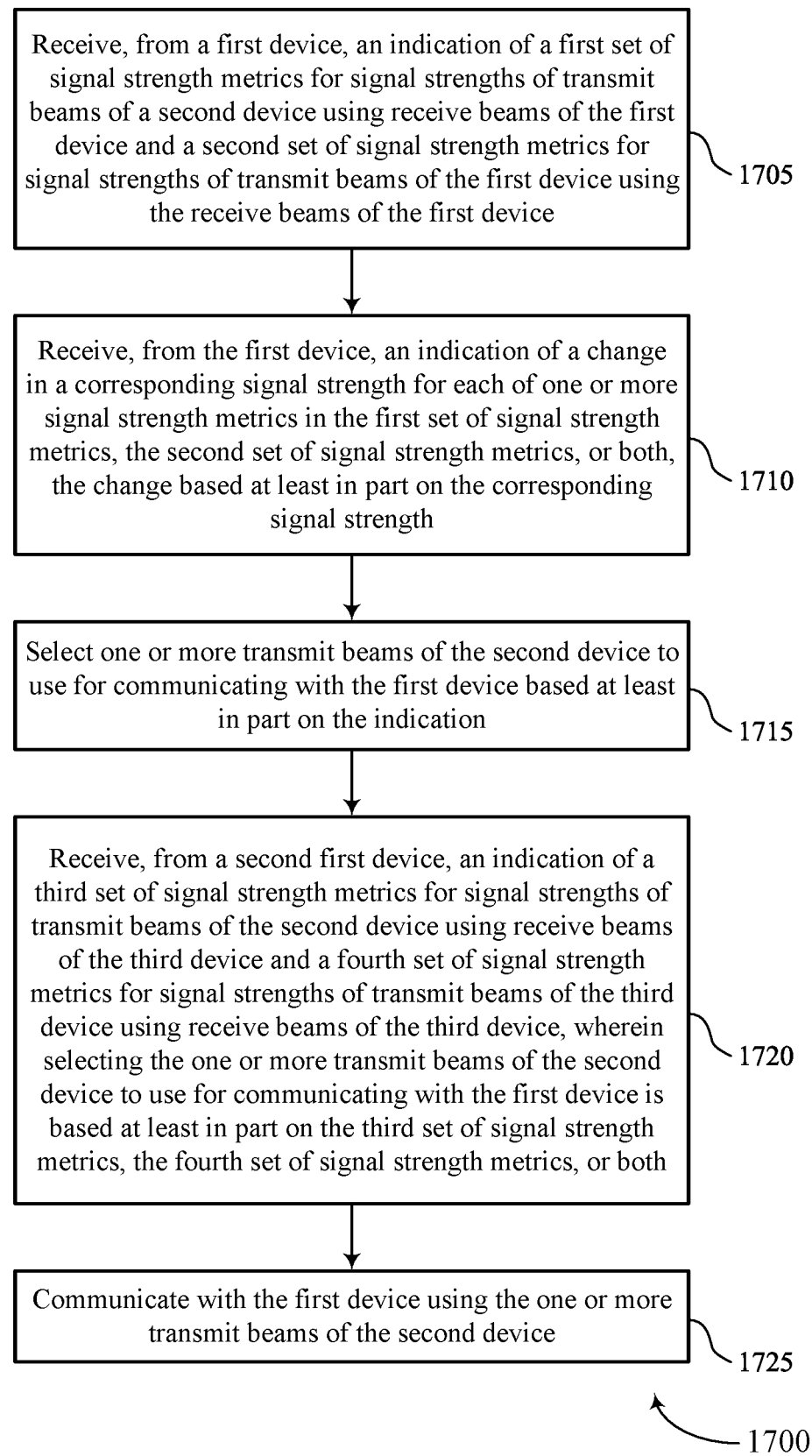

FIG. 17 shows a flowchart illustrating a method 1700 for differential reporting for full-duplex multi-beam communications in accordance with aspects of the present disclosure. The operations of method 1700 may be implemented by a second device (e.g., a UE or base station) or its components as described herein. For example, the operations of method 1700 may be performed by a UE 115 or base station 105 as described with reference to FIGS. 1 through 4 and 9 through 12. In some examples, a second device may execute a set of instructions to control the functional elements of the device to perform the described functions. Additionally or alternatively, the second device may perform aspects of the described functions using special-purpose hardware.

At 1705, the method may include receiving, from a first device, an indication of a first set of signal strength metrics for signal strengths of transmit beams of the second device using receive beams of the first device and a second set of signal strength metrics for signal strengths of transmit beams of the first device using the receive beams of the first device. The operations of 1705 may be performed according to the methods described herein. In some examples, aspects of the operations of 1705 may be performed by a full table manager 1125 as described with reference to FIG. 11.

At 1710, the method may include receiving, from the first device, an indication of a change in a corresponding signal strength for each of one or more signal strength metrics in the first set of signal strength metrics, the second set of signal strength metrics, or both, the change based at least in part on the corresponding signal strength. The operations of 1710 may be performed according to the methods described herein. In some examples, aspects of the operations of 1710 may be performed by a differential table manager 1130 as described with reference to FIG. 11.

At 1715, the method may include selecting one or more transmit beams of the second device to use for communicating with the first device based at least in part on the indication. The operations of 1715 may be performed according to the methods described herein. In some examples, aspects of the operations of 1715 may be performed by a transmit beam manager 1135 as described with reference to FIG. 11.

At 1720, the method may include receiving, from a third device, an indication of a third set of signal strength metrics for signal strengths of transmit beams of the second device using receive beams of the third device and a fourth set of signal strength metrics for signal strengths of transmit beams of the third device using receive beams of the third device, wherein selecting the one or more transmit beams of the second device to use for communicating with the first device is based at least in part on the third set of signal strength metrics, the fourth set of signal strength metrics, or both. The operations of 1720 may be performed according to the methods described herein. In some examples, aspects of the operations of 1720 may be performed by a multi-UE interference manager 1160 as described with reference to FIG. 11.

At 1725, the method may include communicating with the first device using the one or more transmit beams of the second device. The operations of 1725 may be performed according to the methods described herein. In some examples, aspects of the operations of 1725 may be performed by a beamformed communications manager 1140 as described with reference to FIG. 11.

The following provides an overview of aspects of the present disclosure:

Aspect 1: A method for wireless communication at a first device, comprising: transmitting an indication of a first set of signal strength metrics for signal strengths of transmit beams of a second device using receive beams of the first device and a second set of signal strength metrics for signal strengths of transmit beams of the first device using the receive beams of the first device; determining, for one or more signal strength metrics in the first set of signal strength metrics, the second set of signal strength metrics, or both, a change in the corresponding signal strength; and transmitting, based at least in part on the determining, an indication of the change in the corresponding signal strength for each of the one or more signal strength metrics.

Aspect 2: The method of aspect 1, further comprising: receiving a request for an updated first set of signal strength metrics, an updated second set of signal strength metrics, or both, wherein the indication of the change is transmitted based at least in part on the request.

Aspect 3: The method of any of aspects 1 through 2, wherein the determining comprises: determining, for the one or more signal strength metrics in the first set of signal strength metrics, the second set of signal strength metrics, or both, that the corresponding signal strength indicated in the first set of signal strength metrics and the second set of signal strength metrics satisfies a threshold; and determining that an updated corresponding signal strength for the one or more signal strength metrics fails to satisfy the threshold, wherein the indication of the change comprises the one or more signal strength metrics based at least in part on the updated corresponding signal strength failing to satisfy the threshold.

Aspect 4: The method of any of aspects 1 through 3, wherein the determining comprises: determining, for the one or more signal strength metrics in the first set of signal strength metrics, the second set of signal strength metrics, or both, that the corresponding signal strength indicated in the first set of signal strength metrics and the second set of signal strength metrics fails to satisfy a threshold; and determining that an updated corresponding signal strength for the one or more signal strength metrics satisfies the threshold, wherein the indication of the change comprises the one or more signal strength metrics based at least in part on the updated corresponding signal strength satisfying the threshold.

Aspect 5: The method of any of aspects 1 through 4, further comprising: receiving a request for an updated first set of signal strength metrics and an updated second set of signal strength metrics; updating the first set of signal strength metrics based at least in part on measuring a reference signal transmitted by the second device using each of a set of transmit beams of the second device on a per-receive beam of the first device basis; updating the second set of signal strength metrics based at least in part on measuring a reference signal transmitted by the first device using each of a set of transmit beams of the first device on a per-receive beam of the first device basis; and transmitting an indication of the updated first set of signal strength metrics and the updated second set of signal strength metrics.

Aspect 6: The method of any of aspects 1 through 5, further comprising: determining that the change in the signal strength for the corresponding signal strength metrics in the first set of signal strength metrics and the second set of signal strength metrics fails to satisfy a change threshold; and transmitting a request to transmit an indication of the change based at least in part on the change failing to satisfy the change threshold.

Aspect 7: The method of any of aspects 1 through 6, further comprising: determining that the change in the signal strength for the corresponding signal strength metrics in the first set of signal strength metrics and the second set of signal strength metrics satisfies a change threshold; and transmitting a request to transmit an indication of the first set of signal strength metrics and the second set of signal strength metrics based at least in part on the change satisfying the change threshold.

Aspect 8: The method of any of aspects 1 through 7, further comprising: transmitting, based at least in part on the change in the corresponding signal strength, a request to change a periodicity for transmitting the indication of the change.

Aspect 9: The method of any of aspects 1 through 8, further comprising: measuring a signal strength of a reference signal transmitted by the second device using each of a set of transmit beams of the second device on a per-receive beam of the first device basis; comparing each measured signal strength to a corresponding signal strength in the first set of signal strength metrics; and determining that the change from the corresponding signal strength to the measured signal strength for the one or more signal strength metrics satisfies a threshold.

Aspect 10: The method of any of aspects 1 through 9, further comprising: measuring a signal strength of a reference signal transmitted by the first device using each of a set of transmit beams of the first device on a per-receive beam of the first device basis; comparing each measured signal strength to a corresponding signal strength in the second set of signal strength metrics; and determining that the change from the corresponding signal strength to the measured signal strength for the one or more signal strength metrics satisfies a threshold.

Aspect 11: The method of any of aspects 1 through 10, where in the first device, the second device, or both, comprise at least one of a UE or a base station.

Aspect 12: A method for wireless communication at a second device, comprising: receiving, from a first device, an indication of a first set of signal strength metrics for signal strengths of transmit beams of the second device using receive beams of the first device and a second set of signal strength metrics for signal strengths of transmit beams of the first device using the receive beams of the first device; receiving, from the first device, an indication of a change in a corresponding signal strength for each of one or more signal strength metrics in the first set of signal strength metrics, the second set of signal strength metrics, or both, the change based at least in part on the corresponding signal strength; selecting one or more transmit beams of the second device to use for communicating with the first device based at least in part on the indication; and communicating with the first device using the one or more transmit beams of the second device.

Aspect 13: The method of aspect 12, further comprising: transmitting a request for an updated first set of signal strength metrics, an updated second set of signal strength metrics, or both, wherein the indication of the change is received based at least in part on the request.

Aspect 14: The method of any of aspects 12 through 13, wherein transmitting a request for an updated first set of signal strength metrics and an updated second set of signal strength metrics; and receiving an indication of an updated first set of signal strength metrics and an updated second set of signal strength metrics from the first device based at least in part on the request.

Aspect 15: The method of any of aspects 12 through 14, further comprising: receiving, from the first device, a request for the first device to transmit the indication of the change based at least in part on the change failing to satisfy a change threshold.

Aspect 16: The method of any of aspects 12 through 15, further comprising: receiving, from the first device, a request for the first device to transmit an indication of the first set of signal strength metrics and the second set of signal strength metrics based at least in part on the change satisfying a change threshold.

Aspect 17: The method of any of aspects 12 through 16, further comprising: receiving, from a third device, an indication of a third set of signal strength metrics for signal strengths of transmit beams of the second device using receive beams of the third device and a fourth set of signal strength metrics for signal strengths of transmit beams of the third device using receive beams of the third device, wherein selecting the one or more transmit beams of the second device to use for communicating with the first device is based at least in part on the third set of signal strength metrics, the fourth set of signal strength metrics, or both.

Aspect 18: The method of any of aspects 12 through 17, wherein the first device, the second device, or both, comprise at least one of a UE or a base station.

Aspect 19: An apparatus for wireless communication at a first device, comprising a processor; memory coupled with the processor; and instructions stored in the memory and executable by the processor to cause the apparatus to perform a method of any of aspects 1 through 11.

Aspect 20: An apparatus for wireless communication at a first device, comprising at least one means for performing a method of any of aspects 1 through 11.

Aspect 21: A non-transitory computer-readable medium storing code for wireless communication at a first device, the code comprising instructions executable by a processor to perform a method of any of aspects 1 through 11.

Aspect 22: An apparatus for wireless communication at a second device, comprising a processor; memory coupled with the processor; and instructions stored in the memory and executable by the processor to cause the apparatus to perform a method of any of aspects 12 through 18.

Aspect 23: An apparatus for wireless communication at a second device, comprising at least one means for performing a method of any of aspects 12 through 18.

Aspect 24: A non-transitory computer-readable medium storing code for wireless communication at a second device, the code comprising instructions executable by a processor to perform a method of any of aspects 12 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first device, comprising:
   transmitting an indication of a first set of signal strength metrics for signal strengths of transmit beams of a second device as measured via receive beams of the first device;
   transmitting a second set of signal strength metrics for signal strengths of transmit beams of the first device as measured via the receive beams of the first device, wherein the second set of signal strength metrics comprises self-interference information associated with the transmit beams of the first device;
   determining, for one or more signal strength metrics in the first set of signal strength metrics, the second set of signal strength metrics, or both, whether a change in a corresponding signal strength satisfies a change threshold for the one or more signal strength metrics; and
   transmitting, based at least in part on determining that the change in the corresponding signal strength satisfies the change threshold, an indication of the change in the corresponding signal strength for each of the one or more signal strength metrics.

2. The method of claim 1, further comprising:
   receiving a request for an updated first set of signal strength metrics, an updated second set of signal strength metrics, or both, wherein the indication of the change is transmitted based at least in part on the request.

3. The method of claim 1, wherein determining the change in the corresponding signal strength comprises:
   determining, for the one or more signal strength metrics in the first set of signal strength metrics, the second set of signal strength metrics, or both, that the corresponding signal strength indicated in the first set of signal strength metrics and the second set of signal strength metrics satisfies the change threshold; and
   determining that an updated corresponding signal strength for the one or more signal strength metrics fails to satisfy the change threshold, wherein the indication of the change comprises the one or more signal strength metrics based at least in part on the updated corresponding signal strength failing to satisfy the change threshold.

4. The method of claim 1, wherein determining the change in the corresponding signal strength comprises:
   determining, for the one or more signal strength metrics in the first set of signal strength metrics, the second set of signal strength metrics, or both, that the corresponding signal strength indicated in the first set of signal strength metrics and the second set of signal strength metrics fails to satisfy the change threshold; and
   determining that an updated corresponding signal strength for the one or more signal strength metrics satisfies the change threshold, wherein the indication of the change comprises the one or more signal strength metrics based at least in part on the updated corresponding signal strength satisfying the change threshold.

5. The method of claim 1, further comprising:
   receiving a request for an updated first set of signal strength metrics and an updated second set of signal strength metrics;
   updating the first set of signal strength metrics based at least in part on measuring a reference signal transmitted by the second device using each of a set of transmit beams of the second device on a per-receive-beam-of-the-first-device basis;
   updating the second set of signal strength metrics based at least in part on measuring a reference signal transmitted by the first device using each of a set of transmit beams of the first device on a per-receive-beam-of-the-first-device basis; and
   transmitting an indication of the updated first set of signal strength metrics and the updated second set of signal strength metrics.

6. The method of claim 1, further comprising:
   determining that the change in the corresponding signal strength in the first set of signal strength metrics and the second set of signal strength metrics fails to satisfy the change threshold; and
   transmitting a request to transmit an indication of the change based at least in part on the change failing to satisfy the change threshold.

7. The method of claim 1, further comprising:
   determining that the change in the corresponding signal strength in the first set of signal strength metrics and the second set of signal strength metrics satisfies the change threshold; and
   transmitting a request to transmit an indication of the first set of signal strength metrics and the second set of signal strength metrics based at least in part on the change satisfying the change threshold.

8. The method of claim 1, further comprising:
   transmitting, based at least in part on the change in the corresponding signal strength, a request to change a first periodicity for transmitting the indication of the change and a second periodicity for transmitting a full report of the first set of signal strength metrics and the second set of signal strength metrics.

9. The method of claim 1, further comprising:
   measuring a signal strength of a reference signal transmitted by the second device using each of a set of transmit beams of the second device on a per-receive-beam-of-the-first-device basis;
   comparing each measured signal strength to a corresponding signal strength in the first set of signal strength metrics; and
   determining that the change from the corresponding signal strength to the measured signal strength for the one or more signal strength metrics satisfies the change threshold.

10. The method of claim 1, further comprising:
    measuring a signal strength of a reference signal transmitted by the first device using each of a set of transmit beams of the first device on a per-receive-beam-of-the-first-device basis;
    comparing each measured signal strength to a corresponding signal strength in the second set of signal strength metrics; and
    determining that the change from the corresponding signal strength to the measured signal strength for the one or more signal strength metrics satisfies the change threshold.

11. The method of claim 1, wherein:
    the first device and the second device comprise a user equipment (UE) and a network device, a first UE and a second UE, or a first network device and a second network device.

12. A method for wireless communication at a second device, comprising:

receiving, from a first device, an indication of a first set of signal strength metrics for signal strengths of transmit beams of the second device as measured via receive beams of the first device;

receiving, from the first device, a second set of signal strength metrics for signal strengths of transmit beams of the first device as measured via the receive beams of the first device, wherein the second set of signal strength metrics comprises self-interference information associated with the transmit beams of the first device;

receiving, from the first device, an indication of a change in a corresponding signal strength for each of one or more signal strength metrics in the first set of signal strength metrics, the second set of signal strength metrics, or both, the change based at least in part on whether the corresponding signal strength satisfies a change threshold for the one or more signal strength metrics;

selecting one or more transmit beams of the second device to use for communicating with the first device based at least in part on the indication that the change in the corresponding signal strength satisfies the change threshold; and communicating with the first device using the one or more transmit beams of the second device.

13. The method of claim 12, further comprising:
transmitting a request for an updated first set of signal strength metrics, an updated second set of signal strength metrics, or both, wherein the indication of the change is received based at least in part on the request.

14. The method of claim 12, further comprising:
transmitting a request for an updated first set of signal strength metrics and an updated second set of signal strength metrics; and
receiving an indication of an updated first set of signal strength metrics and an updated second set of signal strength metrics from the first device based at least in part on the request.

15. The method of claim 12, further comprising:
receiving, from the first device, a request for the first device to transmit the indication of the change based at least in part on the change failing to satisfy the change threshold.

16. The method of claim 12, further comprising:
receiving, from the first device, a request for the first device to transmit an indication of the first set of signal strength metrics and the second set of signal strength metrics based at least in part on the change satisfying the change threshold.

17. The method of claim 12, further comprising:
receiving, from a third device, an indication of a third set of signal strength metrics for signal strengths of transmit beams of the second device as measured via receive beams of the third device and a fourth set of signal strength metrics for signal strengths of transmit beams of the third device as measured via receive beams of the third device, wherein selecting the one or more transmit beams of the second device to use for communicating with the first device is based at least in part on the third set of signal strength metrics, the fourth set of signal strength metrics, or both.

18. The method of claim 12, wherein:
the first device and the second device comprise a user equipment (UE) and a network device, a first UE and a second UE, or a first network device and a second network device.

19. An apparatus for wireless communication at a first device, comprising:
at least one processor;
at least one memory coupled with the at least one processor; and
instructions stored in the at least one memory and executable by the at least one processor to cause the apparatus to:
transmit an indication of a first set of signal strength metrics for signal strengths of transmit beams of a second device as measured via receive beams of the first device;
transmit a second set of signal strength metrics for signal strengths of transmit beams of the first device as measured via the receive beams of the first device, wherein the second set of signal strength metrics comprises self-interference information associated with the transmit beams of the first device;
determine, for one or more signal strength metrics in the first set of signal strength metrics, the second set of signal strength metrics, or both, whether a change in a corresponding signal strength satisfies a change threshold for the one or more signal strength metrics; and
transmit, based at least in part on determining that the change in the corresponding signal strength satisfies the change threshold, an indication of the change in the corresponding signal strength for each of the one or more signal strength metrics.

20. The apparatus of claim 19, wherein the instructions are further executable by the at least one processor to cause the apparatus to:
receive a request for an updated first set of signal strength metrics, an updated second set of signal strength metrics, or both, wherein the indication of the change is transmitted based at least in part on the request.

21. The apparatus of claim 19, wherein the instructions to determine the change in the corresponding signal strength are executable by the at least one processor to cause the apparatus to:
determine, for the one or more signal strength metrics in the first set of signal strength metrics, the second set of signal strength metrics, or both, that the corresponding signal strength indicated in the first set of signal strength metrics and the second set of signal strength metrics satisfies the change threshold; and
determine that an updated corresponding signal strength for the one or more signal strength metrics fails to satisfy the change threshold, wherein the indication of the change comprises the one or more signal strength metrics based at least in part on the updated corresponding signal strength failing to satisfy the change threshold.

22. The apparatus of claim 19, wherein the instructions to determine the change in the corresponding signal strength are executable by the at least one processor to cause the apparatus to:
determine, for the one or more signal strength metrics in the first set of signal strength metrics, the second set of signal strength metrics, or both, that the corresponding signal strength indicated in the first set of signal strength metrics and the second set of signal strength metrics fails to satisfy the change threshold; and
determine that an updated corresponding signal strength for the one or more signal strength metrics satisfies the change threshold, wherein the indication of the change comprises the one or more signal strength metrics based at least in part on the updated corresponding signal strength satisfying the change threshold.

23. The apparatus of claim 19, wherein the instructions are further executable by the at least one processor to cause the apparatus to:
receive a request for an updated first set of signal strength metrics and an updated second set of signal strength metrics;
update the first set of signal strength metrics based at least in part on measuring a reference signal transmitted by the second device using each of a set of transmit beams of the second device on a per-receive-beam-of-the-first-device basis;
update the second set of signal strength metrics based at least in part on measuring a reference signal transmitted by the first device using each of a set of transmit beams of the first device on a per-receive-beam-of-the-first-device basis; and
transmit an indication of the updated first set of signal strength metrics and the updated second set of signal strength metrics.

24. The apparatus of claim 19, wherein the instructions are further executable by the at least one processor to cause the apparatus to:
determine that the change in the corresponding signal strength in the first set of signal strength metrics and the second set of signal strength metrics fails to satisfy the change threshold; and
transmit a request to transmit an indication of the change based at least in part on the change failing to satisfy the change threshold.

25. The apparatus of claim 19, wherein the instructions are further executable by the at least one processor to cause the apparatus to:
determine that the change in the corresponding signal strength in the first set of signal strength metrics and the second set of signal strength metrics satisfies the change threshold; and
transmit a request to transmit an indication of the first set of signal strength metrics and the second set of signal strength metrics based at least in part on the change satisfying the change threshold.

26. The apparatus of claim 19, wherein the instructions are further executable by the at least one processor to cause the apparatus to:
transmit, based at least in part on the change in the corresponding signal strength, a request to change first periodicity for transmitting the indication of the change and a second periodicity for transmitting a full report of the first set of signal strength metrics and the second set of signal strength metrics.

27. The apparatus of claim 19, wherein the instructions are further executable by the at least one processor to cause the apparatus to:
measure a signal strength of a reference signal transmitted by the second device using each of a set of transmit beams of the second device on a per-receive-beam-of-the-first-device basis;
compare each measured signal strength to a corresponding signal strength in the first set of signal strength metrics; and
determine that the change from the corresponding signal strength to the measured signal strength for the one or more signal strength metrics satisfies the change threshold.

28. The apparatus of claim 19, wherein the instructions are further executable by the at least one processor to cause the apparatus to:
measure a signal strength of a reference signal transmitted by the first device using each of a set of transmit beams of the first device on a per-receive-beam-of-the-first-device basis;
compare each measured signal strength to a corresponding signal strength in the second set of signal strength metrics; and
determine that the change from the corresponding signal strength to the measured signal strength for the one or more signal strength metrics satisfies the change threshold.

29. An apparatus for wireless communication at a second device, comprising:
at least one processor;
at least one memory coupled with the at least one processor; and
instructions stored in the at least one memory and executable by the at least one processor to cause the apparatus to:
receive, from a first device, an indication of a first set of signal strength metrics for signal strengths of transmit beams of the second device as measured via receive beams of the first device;
receive, from the first device, a second set of signal strength metrics for signal strengths of transmit beams of the first device as measured via the receive beams of the first device, wherein the second set of signal strength metrics comprises self-interference information associated with the transmit beams of the first device;
receive, from the first device, an indication of a change in a corresponding signal strength for each of one or more signal strength metrics in the first set of signal strength metrics, the second set of signal strength metrics, or both, the change based at least in part on whether the corresponding signal strength satisfies a change threshold for the one or more signal strength metrics;
select one or more transmit beams of the second device to use for communicating with the first device based at least in part on the indication that the change in the corresponding signal strength satisfies the change threshold; and
communicate with the first device using the one or more transmit beams of the second device.

30. The apparatus of claim 29, wherein the instructions are further executable by the at least one processor to cause the apparatus to:
transmit a request for an updated first set of signal strength metrics, an updated second set of signal strength metrics, or both, wherein the indication of the change is received based at least in part on the request.

* * * * *